United States Patent
Saito et al.

(10) Patent No.: US 10,848,660 B2
(45) Date of Patent: Nov. 24, 2020

(54) IMAGING APPARATUS, IMAGING MODULE, AND CONTROL METHOD OF IMAGING APPARATUS

(71) Applicant: Sony Semiconductor Solutions Corporation, Kanagawa (JP)

(72) Inventors: Keisuke Saito, Kanagawa (JP); Takeshi Akabane, Tokyo (JP)

(73) Assignee: Sony Semiconductor Solutions Corporation, Kangawa (JP)

( * ) Notice: Subject to any disclaimer, the term of this patent is extended or adjusted under 35 U.S.C. 154(b) by 8 days.

(21) Appl. No.: 16/303,253

(22) PCT Filed: Dec. 20, 2017

(86) PCT No.: PCT/JP2017/045693
§ 371 (c)(1),
(2) Date: Nov. 20, 2018

(87) PCT Pub. No.: WO2018/179622
PCT Pub. Date: Oct. 4, 2018

(65) Prior Publication Data
US 2019/0208132 A1    Jul. 4, 2019

(30) Foreign Application Priority Data
Mar. 30, 2017    (JP) .................................. 2017-067102

(51) Int. Cl.
*H04N 5/232* (2006.01)
*H04N 5/225* (2006.01)
(Continued)

(52) U.S. Cl.
CPC ......... *H04N 5/232127* (2018.08); *B60R 1/00* (2013.01); *G02B 7/28* (2013.01);
(Continued)

(58) Field of Classification Search
CPC ....... H04N 5/232127; H04N 5/232123; H04N 5/232122; H04N 5/2258; H04N 13/239;
(Continued)

(56) References Cited

U.S. PATENT DOCUMENTS 6,262,694 B1 *  7/2001  Ishimoto .............. H04N 13/239
                                                                345/1.1
6,549,650 B1 *  4/2003  Ishikawa .............. H04N 13/246
                                                                382/154
(Continued)

FOREIGN PATENT DOCUMENTS

JP    2006-173919 A    6/2006
JP    2014-022806 A    2/2014
(Continued)

OTHER PUBLICATIONS

International Search Report and English translation thereof dated Mar. 27, 2019 in connection with International Application No. PCT/JP2017/045693.

*Primary Examiner* — Nathan J Flynn
*Assistant Examiner* — Tung T Trinh
(74) *Attorney, Agent, or Firm* — Wolf, Greenfield & Sacks, P.C.

(57) ABSTRACT

The focus detection accuracy is improved in an imaging apparatus that detects focus of each of a plurality of lenses. A main side focus control section detects, as a main side in-focus position, a main side lens position where focus is achieved in a main side detection region inside a main side image. A parallax acquisition section acquires parallax proportional to a distance by finding the distance on the basis of the main side in-focus position. A subordinate side detection region setup section sets a subordinate side detection region position in a subordinate side image on the basis of the parallax and the main side detection region position. A subordinate side focus control section detects, as a subor-
(Continued)

dinate side in-focus position, a subordinate side lens position where focus is achieved in the subordinate side detection region.

8 Claims, 31 Drawing Sheets

(51) Int. Cl.
  G02B 7/34 (2006.01)
  B60R 1/00 (2006.01)
  G02B 7/36 (2006.01)
  G02B 7/28 (2006.01)
  G03B 13/36 (2006.01)
  H04N 13/20 (2018.01)
  G03B 19/07 (2006.01)
  G03B 35/08 (2006.01)
  H04N 13/00 (2018.01)
  H04N 13/239 (2018.01)

(52) U.S. Cl.
  CPC .............. *G02B 7/34* (2013.01); *G02B 7/36* (2013.01); *G03B 13/36* (2013.01); *G03B 19/07* (2013.01); *G03B 35/08* (2013.01); *H04N 5/2258* (2013.01); *H04N 5/232* (2013.01); *H04N 5/232122* (2018.08); *H04N 5/232123* (2018.08); *H04N 13/20* (2018.05); B60R 2300/105 (2013.01); B60R 2300/607 (2013.01); *H04N 13/239* (2018.05); *H04N 2013/0081* (2013.01)

(58) Field of Classification Search
  CPC .... H04N 2013/0081; B60R 1/00; G02B 7/34; G02B 7/36; B06R 2300/105
  See application file for complete search history.

(56) References Cited

U.S. PATENT DOCUMENTS

| | | | | |
|---|---|---|---|---|
| 7,933,512 B2* | 4/2011 | Campbell | ............... | G03B 35/00 396/325 |
| 9,565,416 B1* | 2/2017 | Lewkow | ............... | H04N 5/2258 |
| 2002/0006281 A1* | 1/2002 | Owada | ............... | G02B 7/36 396/104 |
| 2004/0202461 A1* | 10/2004 | Nakahara | ............... | G02B 7/36 396/104 |
| 2011/0001797 A1* | 1/2011 | Cookson | ............... | H04N 13/296 348/47 |
| 2011/0018972 A1* | 1/2011 | Pan | ............... | H04N 13/239 348/47 |
| 2012/0027392 A1* | 2/2012 | Kishida | ............... | H04N 13/239 396/87 |
| 2012/0044327 A1* | 2/2012 | Horita | ............... | H04N 9/8042 348/47 |
| 2012/0154647 A1* | 6/2012 | Endo | ............... | H04N 5/23212 348/262 |
| 2012/0177285 A1* | 7/2012 | Tsurube | ............... | H04N 13/243 382/154 |
| 2013/0028582 A1* | 1/2013 | Batur | ............... | G03B 19/07 396/124 |
| 2013/0063576 A1* | 3/2013 | Okubo | ............... | H04N 13/128 348/51 |
| 2013/0162784 A1* | 6/2013 | Ueda | ............... | H04N 13/296 348/49 |
| 2013/0258139 A1* | 10/2013 | Omori | ............... | H04N 5/265 348/239 |
| 2013/0307929 A1* | 11/2013 | Hattori | ............... | H04N 13/172 348/43 |
| 2013/0314500 A1* | 11/2013 | Aoki | ............... | H04N 13/296 348/46 |
| 2014/0285627 A1* | 9/2014 | Kuboi | ............... | H04N 5/3745 348/46 |
| 2014/0333726 A1* | 11/2014 | Tokui | ............... | H04N 5/208 348/46 |
| 2016/0065941 A1* | 3/2016 | Oniki | ............... | H04N 13/239 348/47 |
| 2016/0349522 A1* | 12/2016 | Onuki | ............... | H04N 5/374 |
| 2016/0352982 A1* | 12/2016 | Weaver | ............... | H04N 5/23238 |
| 2017/0003573 A1* | 1/2017 | Dayana | ............... | H04N 5/23212 |

FOREIGN PATENT DOCUMENTS

| | | |
|---|---|---|
| JP | 2016-033563 A | 3/2016 |
| JP | 2016-191927 A | 11/2016 |

* cited by examiner

FIG. 2
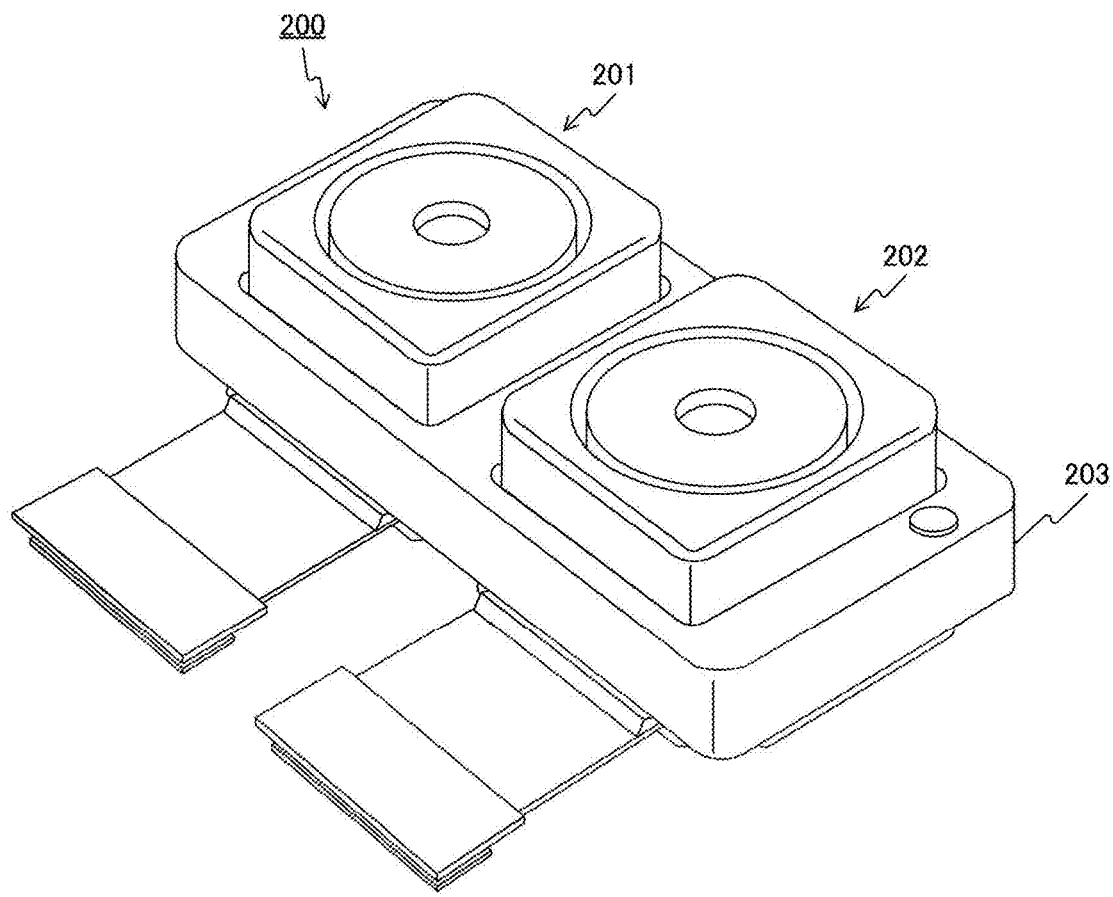
a
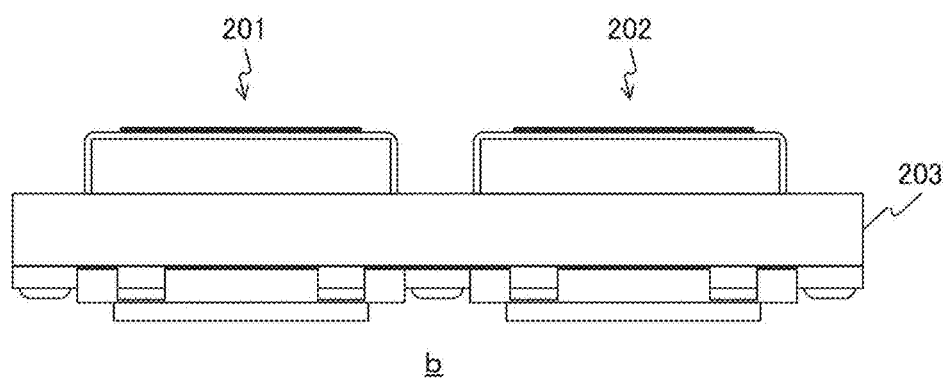
b

F I G. 3
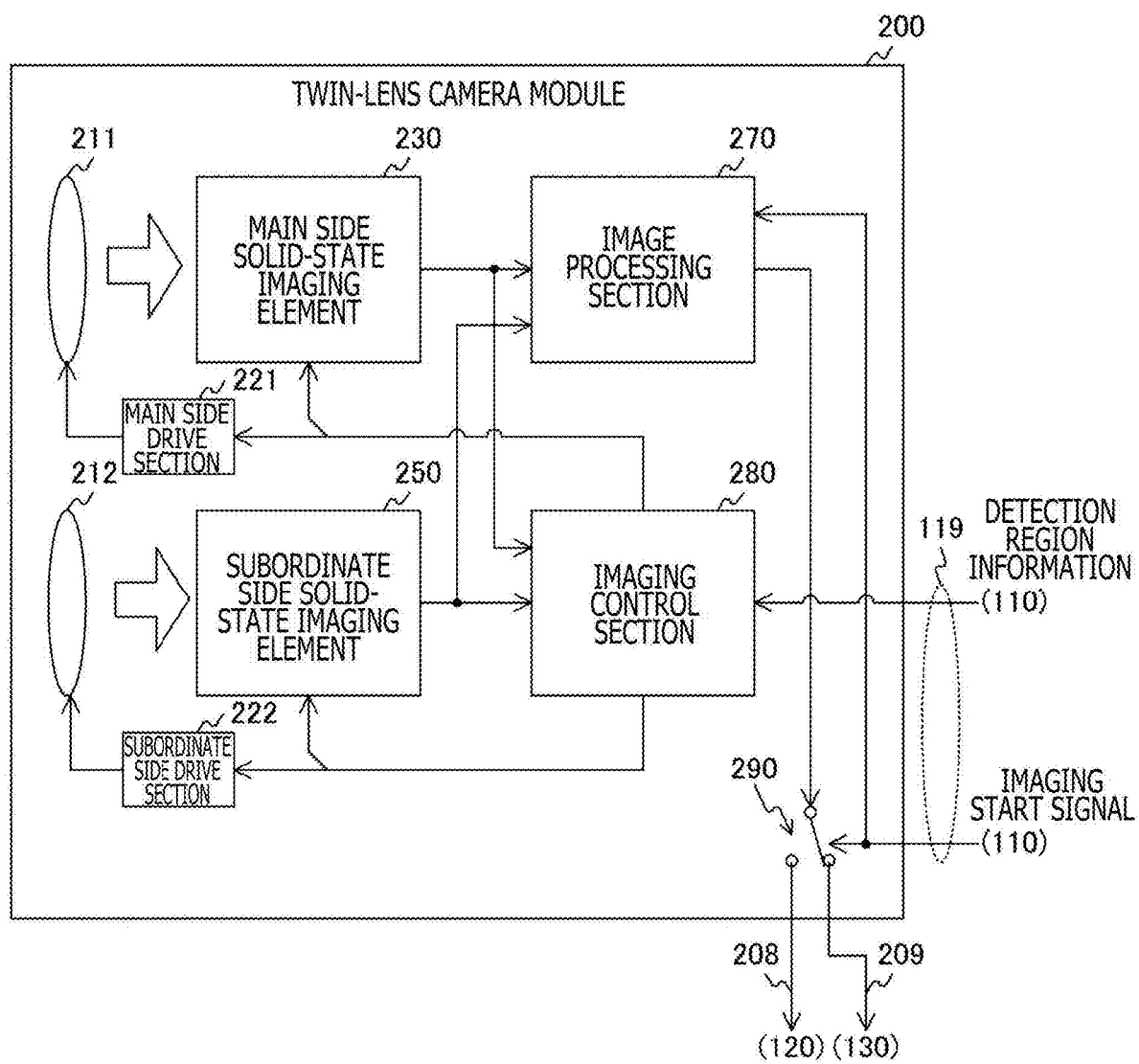

FIG. 6
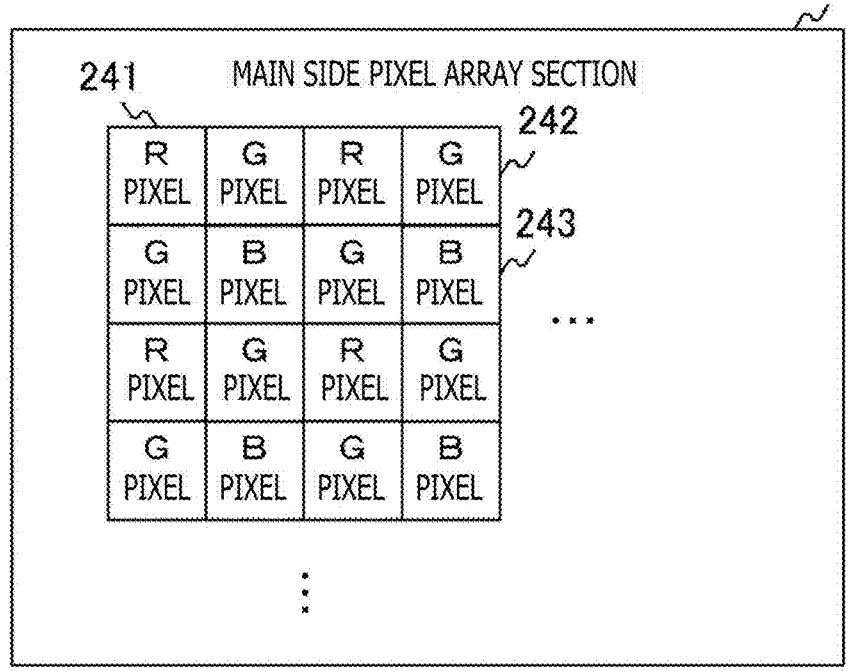
a
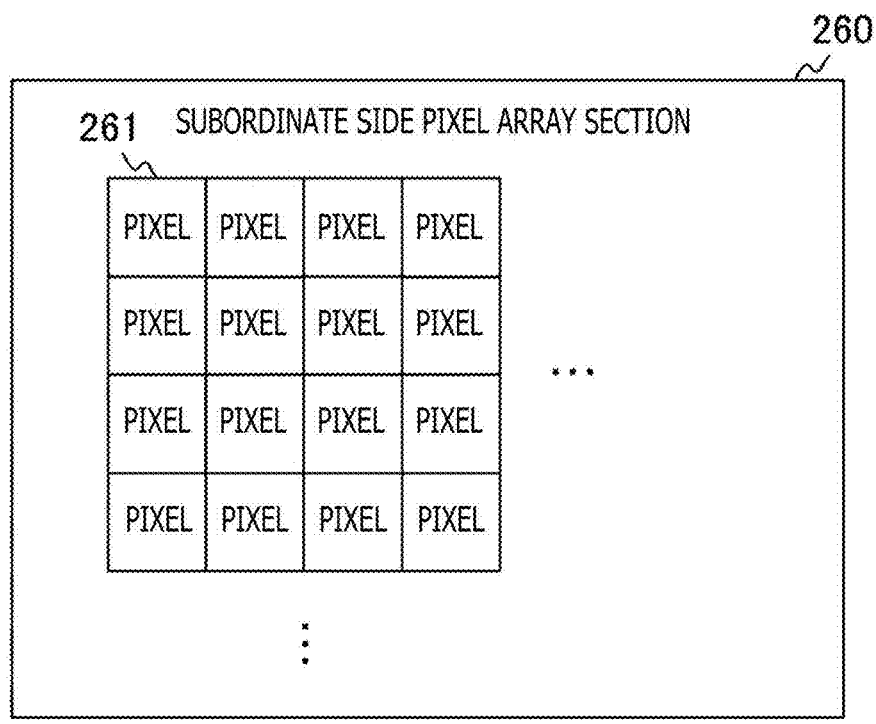
b

FIG.9
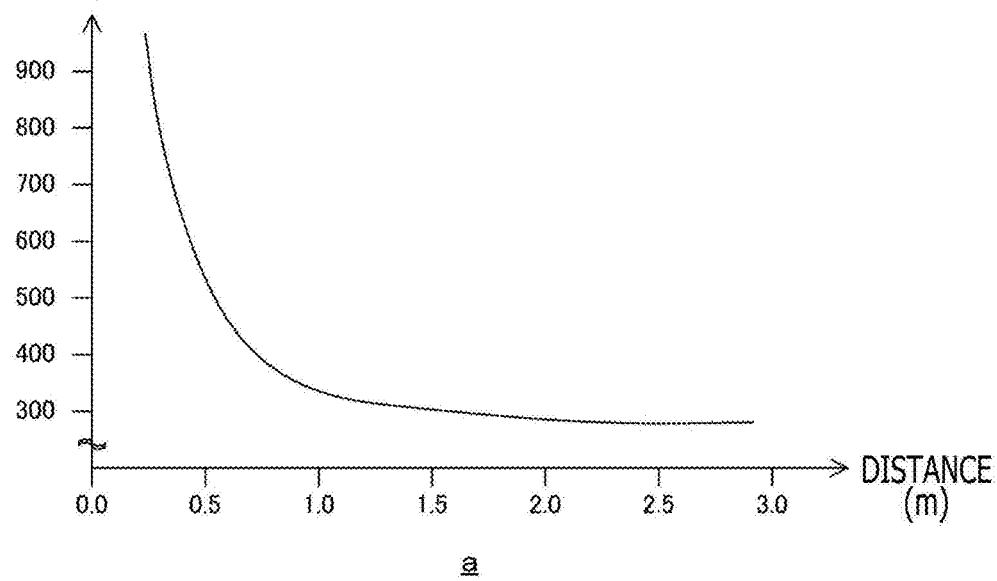
a
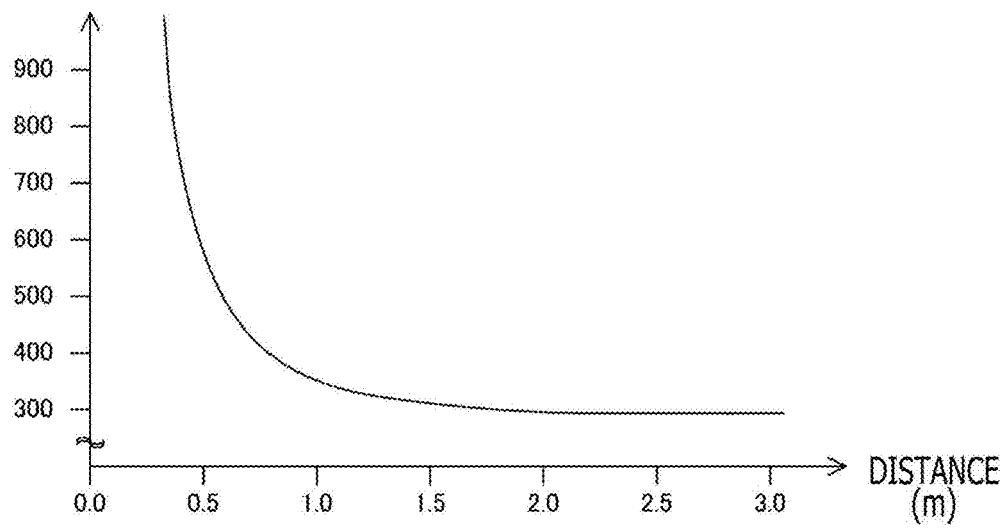
b

FIG.12
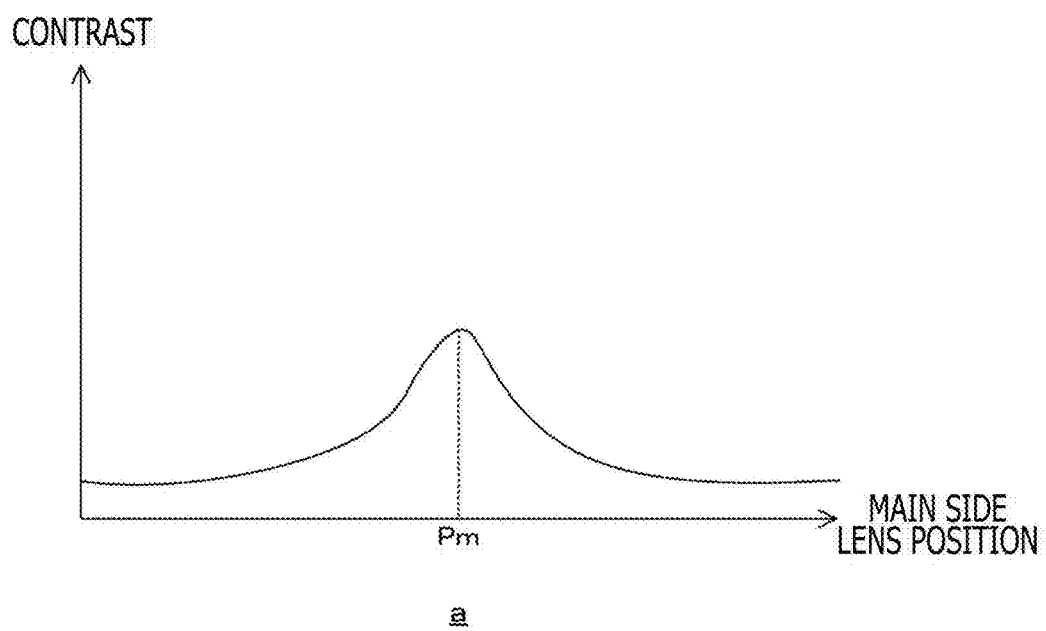
a
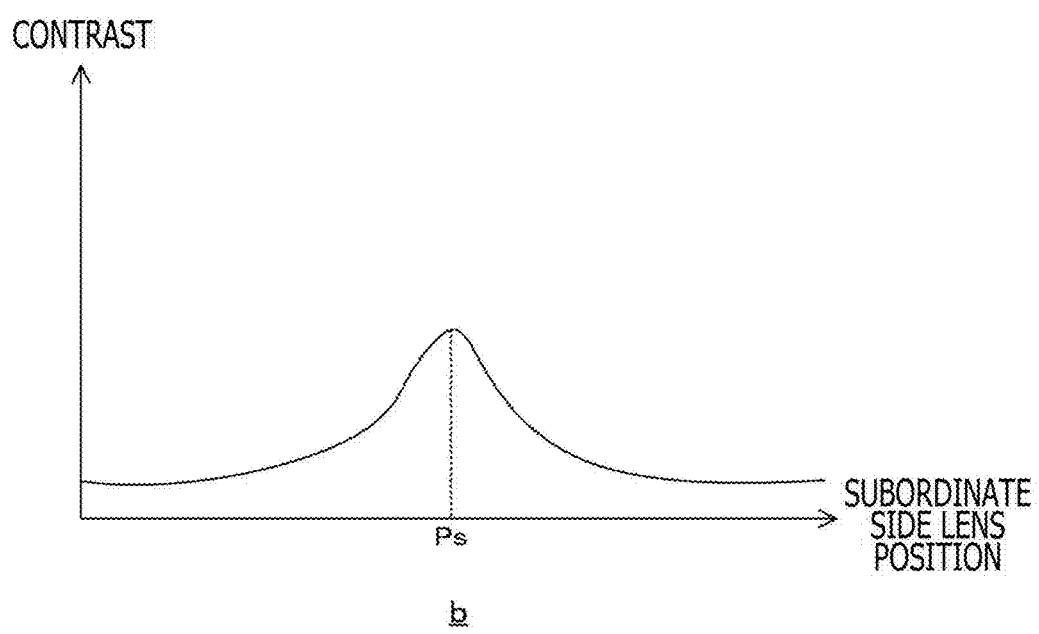
b

FIG.15
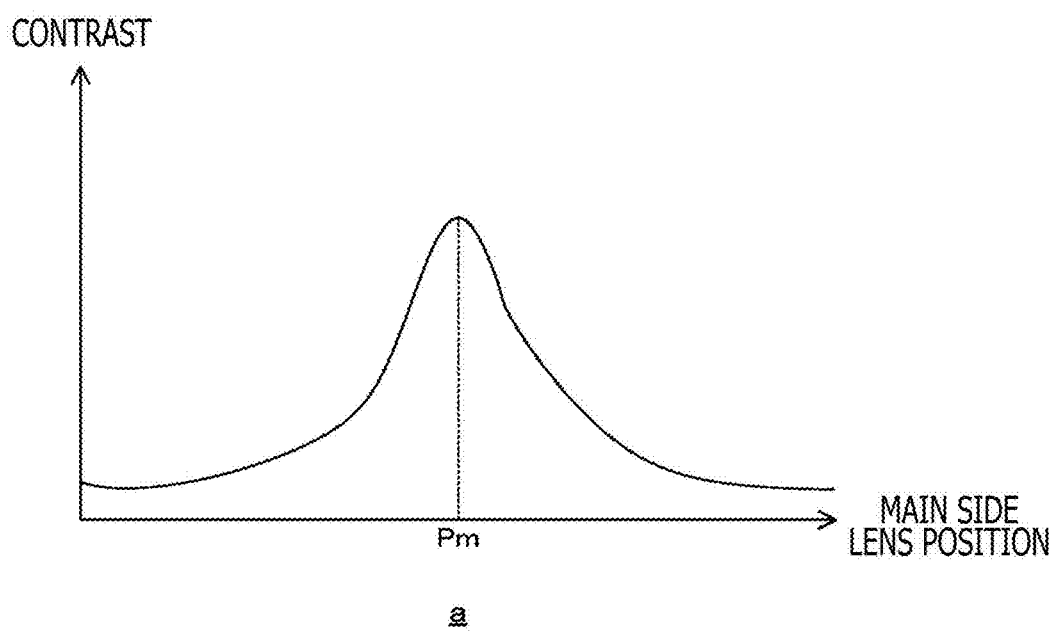
a
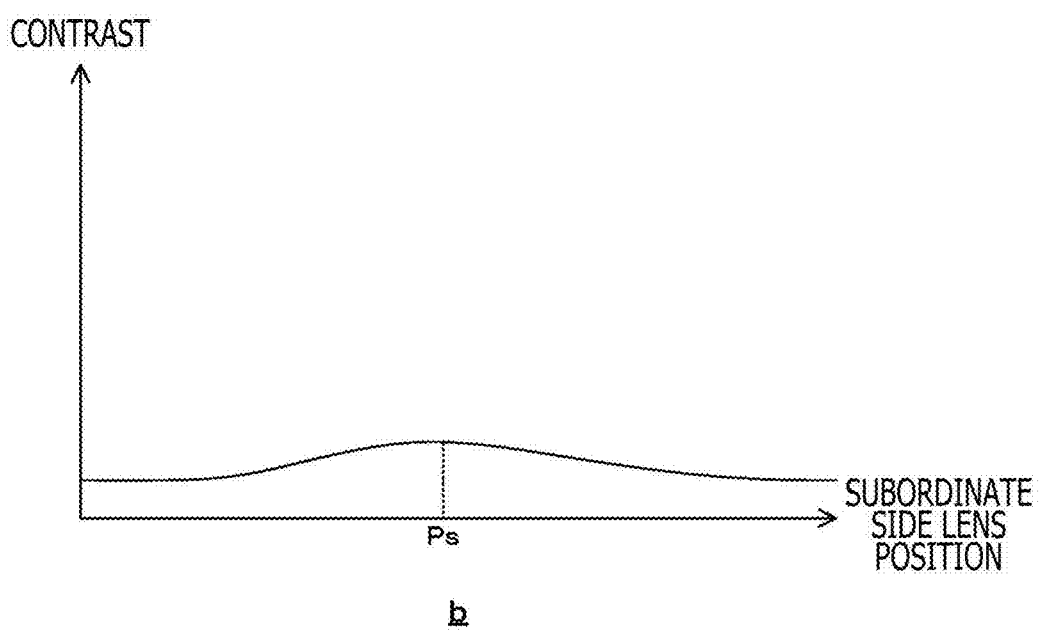
b

FIG. 24
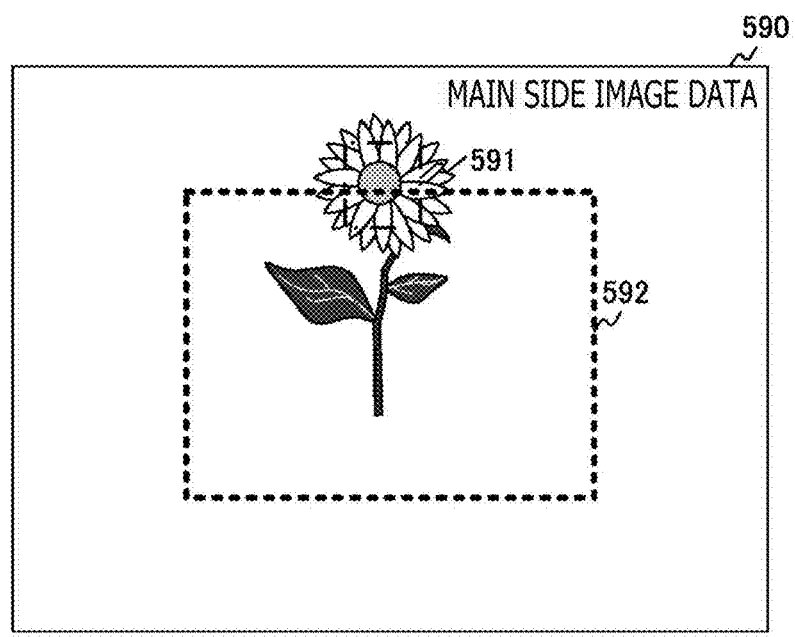
a
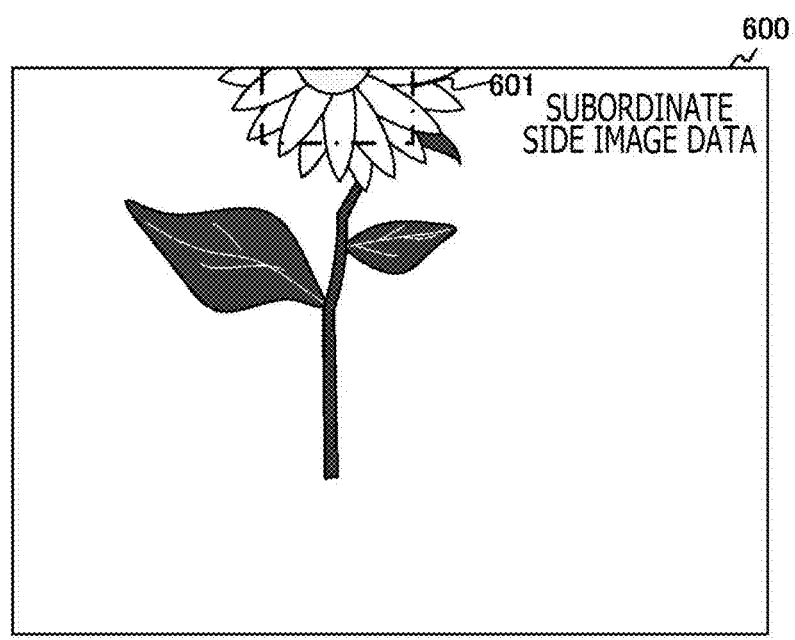
b

F I G . 2 5
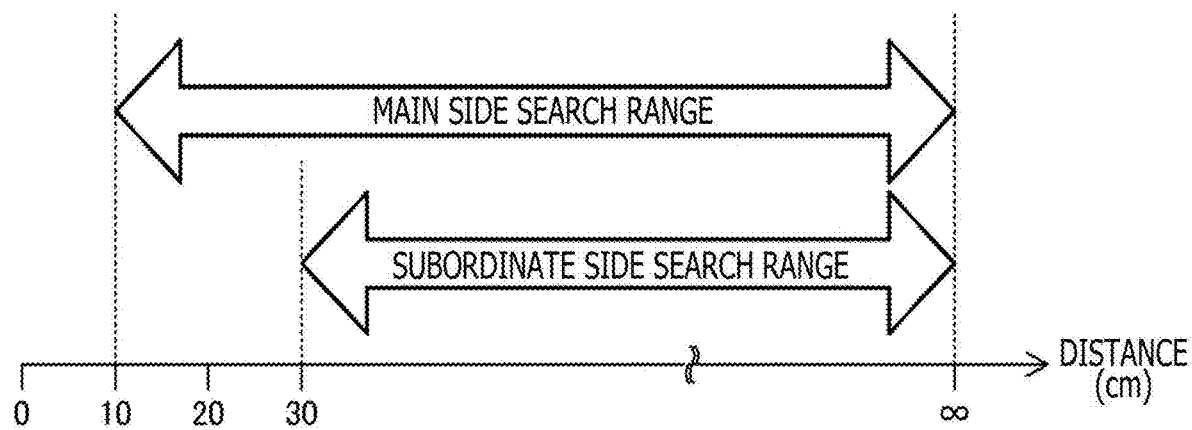

IMAGING APPARATUS, IMAGING MODULE, AND CONTROL METHOD OF IMAGING APPARATUS

CROSS-REFERENCE TO RELATED APPLICATIONS

This application claims the benefit under 35 U.S.C. § 371 as a U.S. National Stage Entry of International Application No. PCT/JP2017/045693, filed in the Japanese Patent Office as a Receiving Office on Dec. 20, 2017, which claims priority to Japanese Patent Application Number JP2017-067102, filed in the Japanese Patent Office on Mar. 30, 2017, each of which is hereby incorporated by reference in its entirety.

TECHNICAL FIELD

The present technology relates to an imaging apparatus, an imaging module, and a control method of an imaging apparatus. More particularly, the present technology relates to an imaging apparatus, an imaging module, and a control method of an imaging apparatus for detecting an in-focus position of each of a plurality of lenses.

BACKGROUND ART

It has been common to use a compound eye type imaging apparatus having a plurality of imaging elements for capturing a plurality of pieces of image data at the same time. For example, a compound eye type imaging apparatus has been proposed that captures images by setting the same imaging parameters for both a right eye imaging unit and a left eye imaging unit (refer, for example, to PTL 1).

CITATION LIST

Patent Literature

[PTL 1]
Japanese Patent Laid-Open No. 2014-36363

SUMMARY

Technical Problem

In the above related art, an imaging apparatus can capture two pieces of image data under the same imaging conditions by setting the same imaging parameters. However, if focus control is performed by bringing a focus region of one of the imaging units in the imaging apparatus into focus and setting that focus region as a focus region of the other imaging unit by the imaging parameters, it is likely that a subject brought into focus with one of the imaging units may not be in focus with the other imaging unit. The reason for this is that if parallax between images captured by the two respective imaging units is large, this causes misalignment of the position where the subject appears in proportion to that parallax, rendering it impossible for the subject to fit into the focus region. Reduced focus detection accuracy as a result of the subject going out of focus in the imaging units leads to a problem of reduced quality of image data captured by the imaging units.

The present technology has been devised in light of such circumstances, and it is an object of the present technology to improve the focus detection accuracy of an imaging apparatus that detects focus of each of a plurality of lenses.

Solution to Problem

The present technology has been developed to solve the above problem, and a first aspect of the present technology is an imaging apparatus and a control method thereof. The imaging apparatus includes a main side focus control section, a parallax acquisition section, a subordinate side detection region setup section, and a subordinate side focus control section. The main side focus control section detects, as a main side in-focus position, a main side lens position where focus is achieved in a main side detection region inside a main side image. The parallax acquisition section acquires parallax proportional to a distance by finding the distance on the basis of the main side in-focus position. The subordinate side detection region setup section sets a subordinate side detection region position in a subordinate side image on the basis of the parallax and the main side detection region position. The subordinate side focus control section detects, as a subordinate side in-focus position, a subordinate side lens position where focus is achieved in the subordinate side detection region. This provides an action that sets a subordinate side detection region position on the basis of parallax and a main side detection region position.

Also, in this first aspect, the subordinate side focus control section may detect the subordinate side in-focus position in the case where, of the subordinate side detection region, the area of the region outside a boundary of the subordinate side image data does not exceed a given value. This provides an action that detects a subordinate side in-focus position in the case where, of a subordinate side detection region, the area of the region outside the boundary thereof is equal to or less than a given value.

Also, in this first aspect, the main side lens and the subordinate side lens may have different view angles, and the subordinate side detection region setup section may set the position and size of the subordinate side detection region on the basis of a magnification of one of the main side image and the subordinate side image relative to the other, the parallax, and the main side detection region position. This provides an action that sets a position and size of a subordinate side detection region on the basis of a magnification, parallax, and a main side detection region position.

Also, in this first aspect, a main side search range, a range of the distance within which focus can be achieved by driving the main side lens, and a subordinate side search range, a range of the distance within which focus can be achieved by driving the subordinate side lens, may be different, and the subordinate side focus control section may detect the subordinate side in-focus position in the case where the area of the region outside the boundary of the subordinate side image data does not exceed a given value and the distance corresponding to the main side in-focus position falls within the subordinate side search range. This provides an action that detects a subordinate side in-focus position in the case where the distance corresponding to a main side in-focus position falls within a subordinate side search range.

Also, in this first aspect, the imaging apparatus may include a main side solid-state imaging element and a subordinate side solid-state imaging element. The main side solid-state imaging element captures the main side image. The subordinate side solid-state imaging element captures the subordinate side image. The main side solid-state imaging element may capture a new main side image when the main side in-focus position is detected, and the subordinate side solid-state imaging element may capture a new subordinate side image when the subordinate side in-focus position is detected. This provides an action that captures a new image when a main side in-focus position is detected.

Also, in this first aspect, the main side focus control section may detect the main side lens position where contrast is the highest in the main side detection region as the main side in-focus position, and the subordinate side focus control section may detect the subordinate side lens position where the contrast is the highest in the subordinate side detection region as the subordinate side in-focus position. This provides an action that detects a lens position where contrast is the highest as an in-focus position.

Also, in this first aspect, the main side focus control section may detect the main side in-focus position on the basis of a phase difference, and the subordinate side focus control section may detect the subordinate side in-focus position on the basis of a phase difference. This provides an action that detects an in-focus position using a phase difference AF method.

Also, a second aspect of the present technology is an imaging module that includes a main side focus control section, a parallax acquisition section, a subordinate side detection region setup section, a subordinate side focus control section, and an image output section. The main side focus control section detects, as a main side in-focus position, a main side lens position where focus is achieved in a main side detection region inside a main side image. The parallax acquisition section acquires parallax proportional to a distance by finding the distance on the basis of the main side in-focus position. The subordinate side detection region setup section sets a subordinate side detection region position in a subordinate side image on the basis of the parallax and the main side detection region position. The subordinate side focus control section detects, as a subordinate side in-focus position, a subordinate side lens position where focus is achieved in the subordinate side detection region. The image output section outputs an image obtained by processing at least either the main side image or the subordinate side image. This provides an action that sets a subordinate side detection region position on the basis of parallax and a main side detection region position and outputs an image obtained by processing at least either a main side image or a subordinate side image.

Advantageous Effect of Invention

The present technology provides an excellent effect of improving focus detection accuracy in an imaging apparatus that detects focus of each of a plurality of lenses. It should be noted that the effect described herein is not necessarily limited and may be any one of the effects described in this disclosure.

BRIEF DESCRIPTION OF DRAWINGS

FIG. 2 depicts diagrams illustrating a configuration example of appearance of a twin-lens camera module in the first embodiment of the present technology.

FIG. 3 is a block diagram illustrating a configuration example of the twin-lens camera module in the first embodiment of the present technology.

FIG. 6 depicts examples of plan views of a main side pixel array section and a subordinate side pixel array section in the first embodiment of the present technology.

FIG. 9 depicts graphs illustrating relationships between a main side lens position and a subordinate side lens position and a distance in the first embodiment of the present technology.

FIG. 12 depicts graphs illustrating examples of relationships between contrast and the main side lens position and the subordinate side lens position in the case where the distance is far in the first embodiment of the present technology.

FIG. 15 depicts graphs illustrating examples of relationships between contrast and the main side lens position and the subordinate side lens position before shifting in the case where the distance is close in the first embodiment of the present technology.

FIG. 24 depicts diagrams illustrating examples of main side image data and subordinate side image data in the case where part of the subordinate side detection region is pushed off the image data in the second embodiment of the present technology.

FIG. 25 is a diagram illustrating an example of a main side search range and a subordinate side search range in the second embodiment of the present technology.

DESCRIPTION OF EMBODIMENTS

A description will be given below of modes for carrying out the present technology (hereinafter referred to as embodiments). The description will be given in the following order:
1. First Embodiment (Example in Which a Detection Region is Set at a Position Shifted in Proportion to Parallax)
2. Second Embodiment (Example in Which a Detection Region is Set at a Position Shifted in Proportion to Parallax in Image Data Having Narrow View Angle)
3. Example of Application to Mobile Body

1. First Embodiment

Configuration Example of Imaging Apparatus

Figure 1:
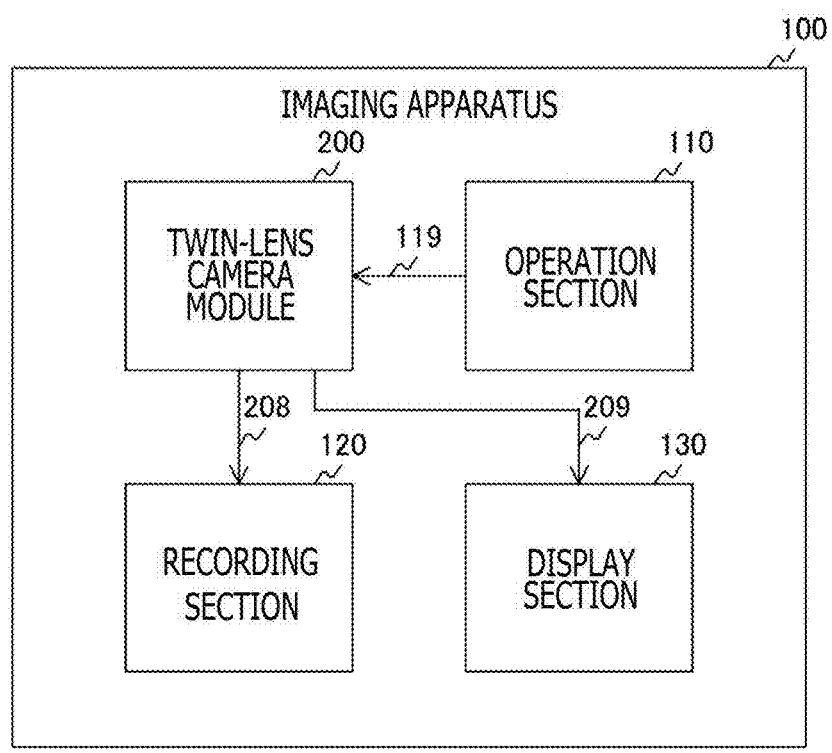
FIG. 1 is a block diagram illustrating a configuration example of an imaging apparatus in a first embodiment of the present technology.

FIG. 1 is a block diagram illustrating a configuration example of an imaging apparatus 100 in a first embodiment of the present technology. This imaging apparatus 100 is capable of capturing image data and includes an operation section 110, a twin-lens camera module 200, a recording section 120, and a display section 130. A smartphone or a personal computer having an imaging function or other device is possible as the imaging apparatus 100.

The operation section 110 generates data in accordance with user operation. This operation section 110 generates an operation signal when an operation is performed to set a position of a detection region, a region for detecting an in-focus position, supplying the signal to the twin-lens camera module 200 via a signal line 119. Here, the position of the detection region is set, for example, by the user tapping the display section 130 with a finger. Also, the operation section 110 generates an imaging start signal that instructs that image data be recorded when the user presses a shutter button, supplying the signal to the twin-lens camera module 200 via the signal line 119. It should be noted that the setting of a detection region is not limited to that by tapping with a finger, and a detection region may be set, for example, by using directional keys and an Enter button.

The twin-lens camera module 200 captures two pieces of image data at the same time using two solid-state imaging elements. This twin-lens camera module 200 generates image data in synchronism with a vertical synchronizing signal at a given frequency (e.g., 30 Hz) and supplies the data as a preview image to the display section 130 via a signal line 209. Also, the twin-lens camera module 200 sets a detection region in accordance with an operation signal and detects a lens position in the detection region where a subject is in focus as an in-focus position. Then, upon receipt of an imaging start signal, the twin-lens camera module 200 captures image data and supplies the captured image data to the recording section 120 via a signal line 208 as an image to be recorded. It should be noted that the twin-lens camera module 200 is an example of an imaging module described in the scope of claims.

The recording section 120 records images to be recorded. A flash memory, for example, is used as the recording section 120.

The display section 130 displays a preview image. A touch panel, for example, is used as the display section 130.

Configuration Example of Twin-Lens Camera Module

FIG. 2 depicts diagrams illustrating a configuration example of appearance of the twin-lens camera module in the first embodiment of the present technology. a in the figure is a perspective view of the twin-lens camera module 200, and b in the figure is a front view of the twin-lens camera module 200.

The twin-lens camera module 200 is a compound eye type camera module and includes a single lens camera module 201 and a single lens camera module 202 that are fastened together with a connecting member 203 in the shape of a rectangular plate.

The single lens camera module 201 incorporates a solid-state imaging element such as CMOS (Complementary Metal Oxide Semiconductor), a lens unit, and so on.

In the single lens camera module 201, the solid-state imaging element includes a pixel section, a peripheral circuit section, and so on. The pixel section has a plurality of pixels arranged in a two-dimensional manner. The peripheral circuit section handles tasks such as driving of the pixels and A/D (Analog/Digital) conversion. In this solid-state imaging element, light (image light) that enters from a lens in the lens unit forms an image on a light-receiving surface of the pixel section, and light of the image formed is converted into an electric current, thereby generating an image signal.

The single lens camera module 202 incorporates a CMOS image sensor, a lens unit, and so on as does the single lens camera module 201. For example, the twin-lens camera module 200 can use the single lens camera module 201 as a main camera and the single lens camera module 202 as a subordinate camera.

The connecting member 203 is in the shape of a rectangular plate having an outline larger than the size of the lens unit of the single lens camera module 201 and the lens unit of the single lens camera module 202 in the planar direction when the lens units are arranged side by side. Also, the connecting member 203 has a rectangular insertion hole portion into which the lens unit of the single lens camera module 201 is inserted and a rectangular insertion hole portion into which the lens unit of the single lens camera module 202 is inserted.

In the twin-lens camera module 200, the lens unit of the single lens camera module 201 and the lens unit of the single lens camera module 202 are inserted into and fastened to the two rectangular insertion hole portions that are formed in such a manner as to penetrate the connecting member 203. As a result, the twin-lens camera module 200 is configured as a compound eye type camera module having the single lens camera module 201 and the single lens camera module 202. The twin-lens camera module 200 is configured as described above.

It should be noted that the single lens camera module 201 and the single lens camera module 202 are examples of a plurality of single lens camera modules connected by the connecting member 203 and will be hereinafter referred to as the single lens camera modules 201 for description in the case where there is no need to make a distinction therebetween.

Also, a single lens camera module refers to a camera module incorporating a single solid-state imaging element (image sensor). On the other hand, a twin-lens camera module refers to a camera module that incorporates two solid-state imaging elements (image sensors) by connecting two single lens camera modules. It should be noted, however, that a module may be called by other name such as package.

FIG. 3 is a block diagram illustrating a configuration example of the twin-lens camera module 200 in the first embodiment of the present technology. This twin-lens camera module 200 includes imaging lenses 211 and 212, a main side drive section 221, a subordinate side drive section 222, a main side solid-state imaging element 230, a subordinate side solid-state imaging element 250, an image processing section 270, an imaging control section 280, and a switch 290.

The imaging lens 211, the main side drive section 221, and the main side solid-state imaging element 230 in FIG. 3 are provided inside the single lens camera module 201 illustrated in FIG. 2. On the other hand, the imaging lens 212, the subordinate side drive section 222, and the subordinate side solid-state imaging element 250 are provided inside the single lens camera module 202 illustrated in FIG. 2. The image processing section 270, the imaging control section 280, and the switch 290 may be provided only in the single lens camera module 201 or 202 or in the single lens camera modules 201 and 202 in a distributed manner.

The imaging lens 211 condenses light from a subject and guides it to the main side solid-state imaging element 230. A single focus lens having a fixed focal distance, for example, is used as the imaging lens 211. It should be noted that the imaging lens 211 is an example of a main side lens described in the scope of claims.

The imaging lens 212 condenses light from a subject and guides it to the subordinate side solid-state imaging element 250. A single focus lens having a fixed focal distance, for example, is used as the imaging lens 212. Further, the view angles of the imaging lens 211 and the imaging lens 212 are the same as each other. It should be noted that the imaging lens 212 is an example of a subordinate side lens described in the scope of claims.

The main side drive section 221 drives the imaging lens 211 along an optical axis direction under control of the imaging control section 280. For example, a circuit having a DAC (Digital to Analog Converter) and an actuator is used as the main side drive section 221. The subordinate side drive section 222 drives the imaging lens 212 along the optical axis direction under control of the imaging control section 280.

The main side solid-state imaging element 230 captures image data under control of the imaging control section 280. This main side solid-state imaging element 230 captures color image data that has pixel data including color information as main side image data and supplies the main side image data to the image processing section 270 and the imaging control section 280. This main side image data has R (Red), G (Green), and B (Blue) pixel data arranged in Bayer pattern and is also referred to as RAW image data.

The subordinate side solid-state imaging element 250 captures image data under control of the imaging control section 280. This subordinate side solid-state imaging element 250 captures monochrome image data that has pixel data not including color information as subordinate side image data and supplies the subordinate side image data to the image processing section 270 and the imaging control section 280. Also, the total number of pixels of subordinate side image data may be the same as or different from that of main side image data.

The image processing section 270 performs given image processing on main side image data and subordinate side image data. In the case where an imaging start signal is not input, this image processing section 270 performs a mosaicing process or other process on main side image data and supplies the data to the switch 290 as a preview image.

Also, upon input of an imaging start signal, the image processing section 270 combines main side image data and subordinate side image data and supplies the data to the switch 290 as an image to be recorded. Main side image data in Bayer pattern needs interpolation through a demosaicing process. As a result of this process, the G resolution is reduced to half the total number of pixels, and the R and B resolutions are reduced to a quarter of the total number of pixels. On the other hand, subordinate side image data does not need a demosaicing process, thereby offering higher resolution than demosaiced main side image data. Therefore, it is possible to compensate for pixel information lacking in main side image data by synthesizing subordinate side image data, thereby providing synthesized image data with higher quality than in the case where data is not synthesized. It should be noted that the image processing section 270 can perform white balance correction, face recognition process, and other image processing as necessary in addition to the demosaicing process and the synthesizing process.

The imaging control section 280 controls imaging operation of the twin-lens camera module 200. This imaging control section 280 sets a rectangular region of a given size at a position set by an operation signal as a main side detection region in main side image data. Then, the imaging control section 280 detects the position of the imaging lens 211 where focus is achieved as a main side in-focus position on the basis of contrast of the main side detection region. Next, the imaging control section 280 supplies a digital value indicating the lens position on the optical axis to the main side drive section 221, thereby causing the imaging lens 211 to be driven to the main side in-focus position.

Also, the imaging control section 280 finds the distance to the subject on the basis of the main side in-focus position and acquires parallax proportional to the distance. Then, the imaging control section 280 sets a rectangular region of a given size as a subordinate side detection region in subordinate side image data on the basis of the parallax and the position of the main side detection region. We assume that the size of this subordinate side detection region is the same as that of the main side detection region. The imaging control section 280 detects the position of the imaging lens 212 where focus is achieved as a subordinate side in-focus position on the basis of contrast of the subordinate side detection region. Then, the imaging control section 280 supplies a digital value indicating the lens position on the optical axis to the subordinate side drive section 222, thereby causing the imaging lens 212 to be driven to the subordinate side in-focus position.

The switch 290 switches the destination to which image data is output in accordance with an imaging start signal. This switch 290 outputs a preview image from the image processing section 270 to the display section 130 in the case where no imaging start signal is input. On the other hand, in the case where an imaging start signal is input, the switch 290 outputs an image to be recorded from the image processing section 270 to the recording section 120. It should be noted that the switch 290 is an example of an output section described in the scope of claims.

Also, the imaging control section 280 sets exposure parameters such as exposure time and gain on both the main side solid-state imaging element 230 and the subordinate side solid-state imaging element 250.

Configuration Example of Main Side Solid-State Imaging Element

Figure 4:
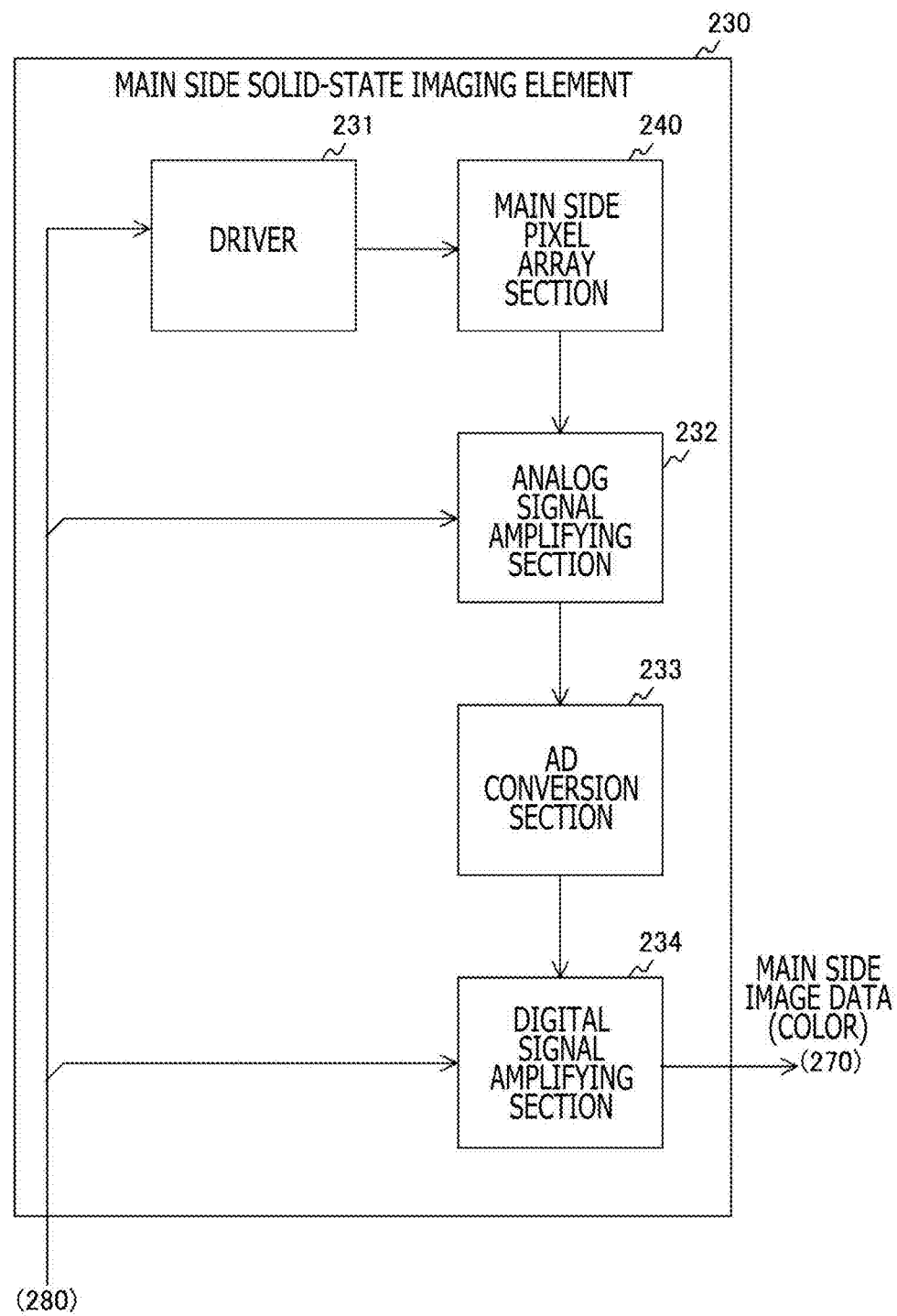
FIG. 4 is a block diagram illustrating a configuration example of a main side solid-state imaging element in the first embodiment of the present technology.

FIG. 4 is a block diagram illustrating a configuration example of the main side solid-state imaging element 230 in the first embodiment of the present technology. This main side solid-state imaging element 230 includes a driver 231, a main side pixel array section 240, an analog signal amplifying section 232, an AD (Analog to Digital) conversion section 233, and a digital signal amplifying section 234.

The driver 231 scans the main side pixel array section 240. A timing signal synchronous with the vertical synchronizing signal and exposure time are input to this driver 231. The driver 231 selects, in sequence, lines in the main side pixel array section 240 and causes these lines to be exposed over the exposure time.

The main side pixel array section 240 has R, G, and B pixels arranged in Bayer pattern. Each of the R, G, and B pixels generates an analog pixel signal and supplies it to the analog signal amplifying section 232 under control of the driver 231.

The analog signal amplifying section 232 amplifies a pixel signal. An analog gain is input to this analog signal amplifying section 232. The analog signal amplifying section 232 amplifies a pixel signal from the main side pixel array section 240 by the analog gain, supplying the pixel signal to the AD conversion section 233.

The AD conversion section 233 converts each of analog pixel signals into digital pixel data. This AD conversion section 233 supplies each piece of pixel data to the digital signal amplifying section 234.

The digital signal amplifying section 234 amplifies pixel data. A digital gain is input to this digital signal amplifying section 234. The digital signal amplifying section 234 amplifies pixel data by the digital gain, supplying the pixel data to the image processing section 270 and the imaging control section 280.

Configuration Example of Subordinate Side Solid-State Imaging Element

Figure 5:
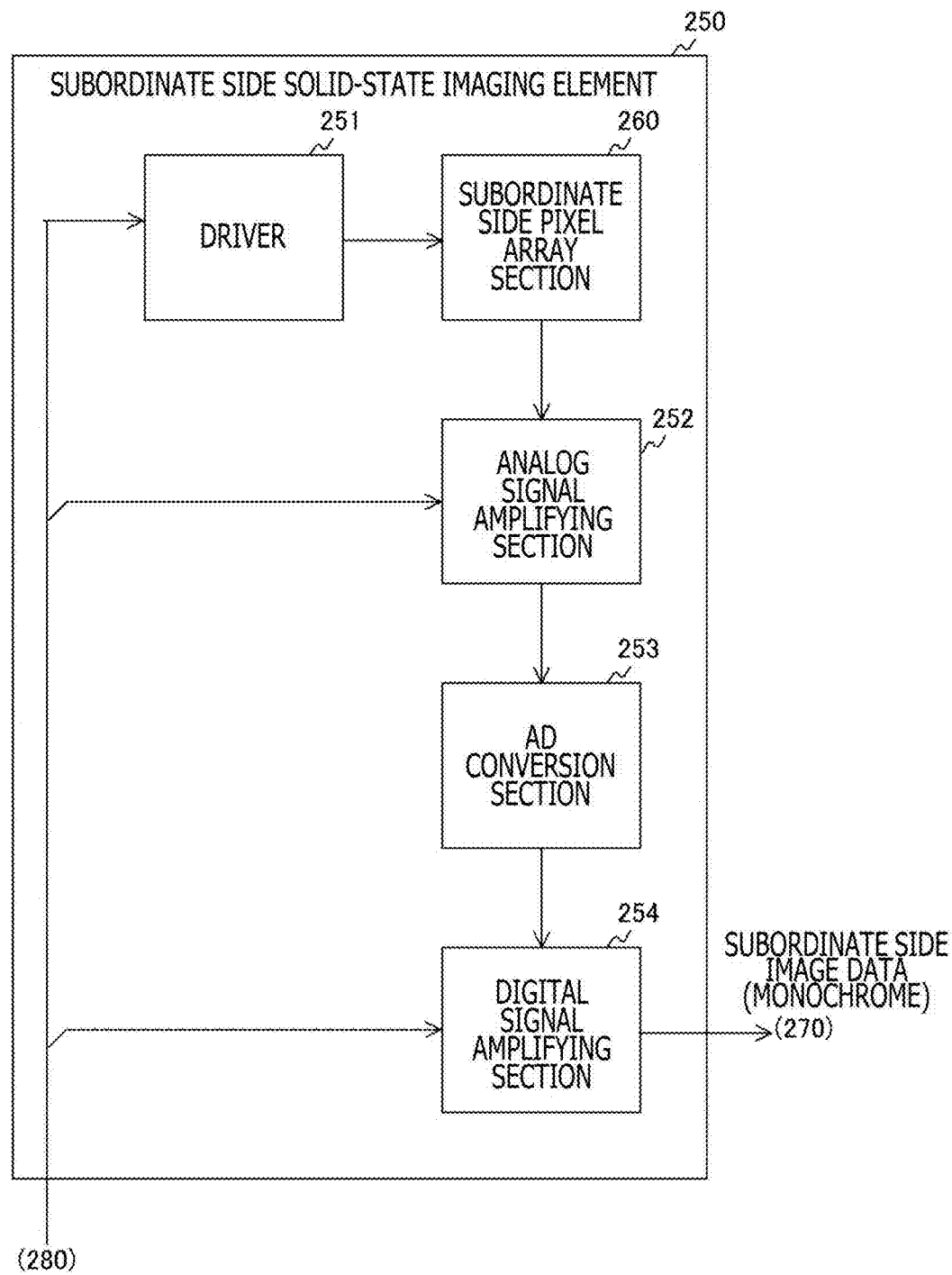
FIG. 5 is a block diagram illustrating a configuration example of a subordinate side solid-state imaging element in the first embodiment of the present technology.

FIG. 5 is a block diagram illustrating a configuration example of the subordinate side solid-state imaging element 250 in the first embodiment of the present technology. This subordinate side solid-state imaging element 250 includes a driver 251, a subordinate side pixel array section 260, an analog signal amplifying section 252, an AD conversion section 253, and a digital signal amplifying section 254.

The driver 251 has a similar configuration to the main side driver 231. The subordinate side pixel array section 260 has a plurality of pixels arranged in a two-dimensional lattice form. The analog signal amplifying section 252 has a similar configuration to the main side analog signal amplifying section 232. The digital signal amplifying section 254 has a similar configuration to the main side digital signal amplifying section 234.

Configuration Example of Pixel Array Section

FIG. 6 depicts examples of plan views of the main side pixel array section 240 and the subordinate side pixel array section 260 in the first embodiment of the present technology. a in the figure is an example of a plan view of the main side pixel array section 240, and b in the figure is an example of a plan view of the subordinate side pixel array section 260.

The main side pixel array section 240 has a given number of R pixels 241, G pixels 242, and B pixels 243 arranged in a two-dimensional lattice form in Bayer pattern. The total number of pixels of the main side pixel array section 240 may be the same as or different from that of the subordinate side pixel array section 260. The R pixel 241 has a color filter that passes red light, and the G pixel 242 has a color filter that passes green light. The B pixel 243 has a color filter that passes blue light.

On the other hand, the subordinate side pixel array section 260 has a plurality of pixels 261 arranged in a two-dimensional lattice form. Then, each of the pixels 261 does not have a color filter. For this reason, the subordinate side pixel array section 260 captures monochrome image data that does not include color information.

Figure 7:
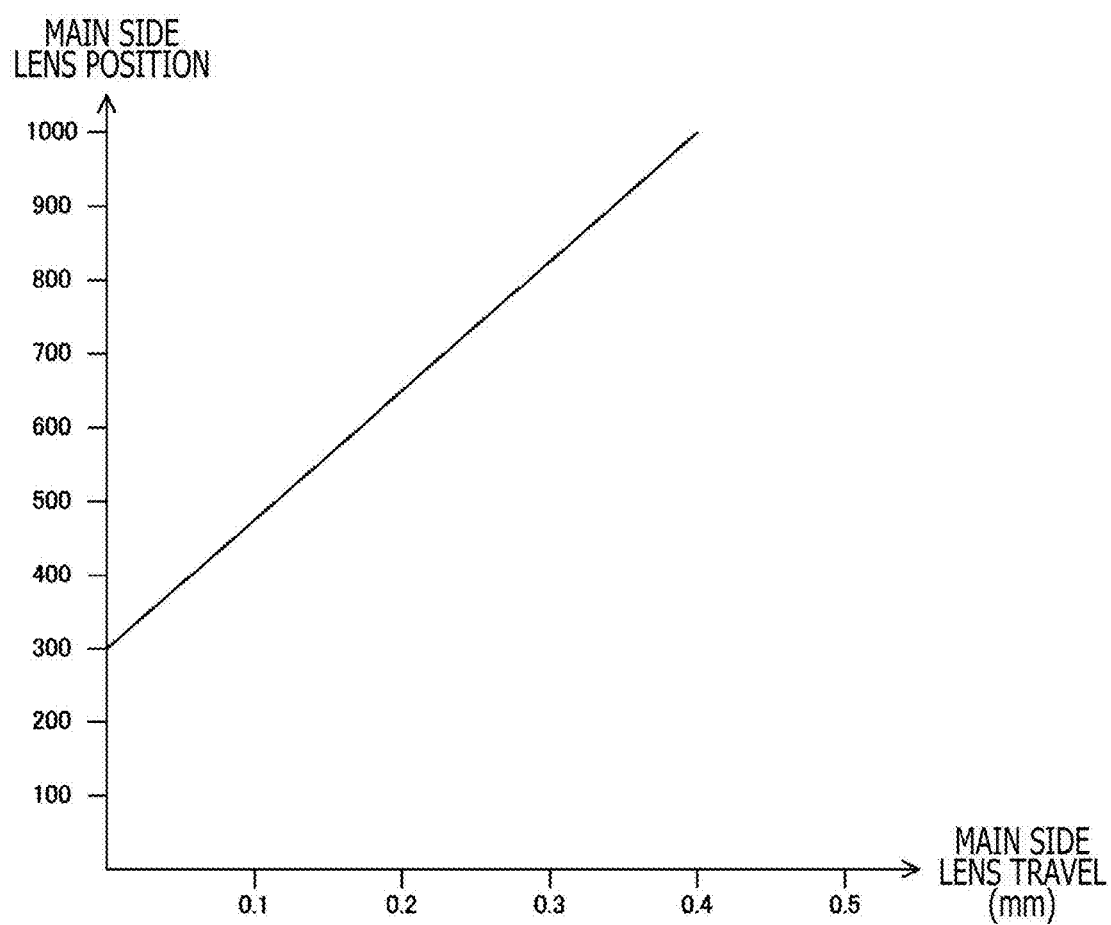
FIG. 7 is a graph illustrating an example of a relationship between a main side lens position and travel of the main side lens in the first embodiment of the present technology.

FIG. 7 is a graph illustrating an example of a relationship between a main side lens position and travel of the main side lens in the first embodiment of the present technology. The vertical axis in the figure indicates a digital value set on the DAC in the main side drive section 221 as a value indicating a main side lens position. Also, the horizontal axis in the figure indicates a travel of the imaging lens 211 driven by an actuator in the main side drive section 221 from a given position. As illustrated in the figure, the relationship between the digital value and the lens travel is expressed by the following expression:

$$L = c \times D + L_0 \qquad \text{Expression 1}$$

In the above expression, L is the digital value indicating the main side lens position. C is the slope, and $L_0$ is the intercept. D is the travel of the main side lens, and the unit is, for example, in millimeters (mm).

Configuration Example of Imaging Control Section

Figure 8:
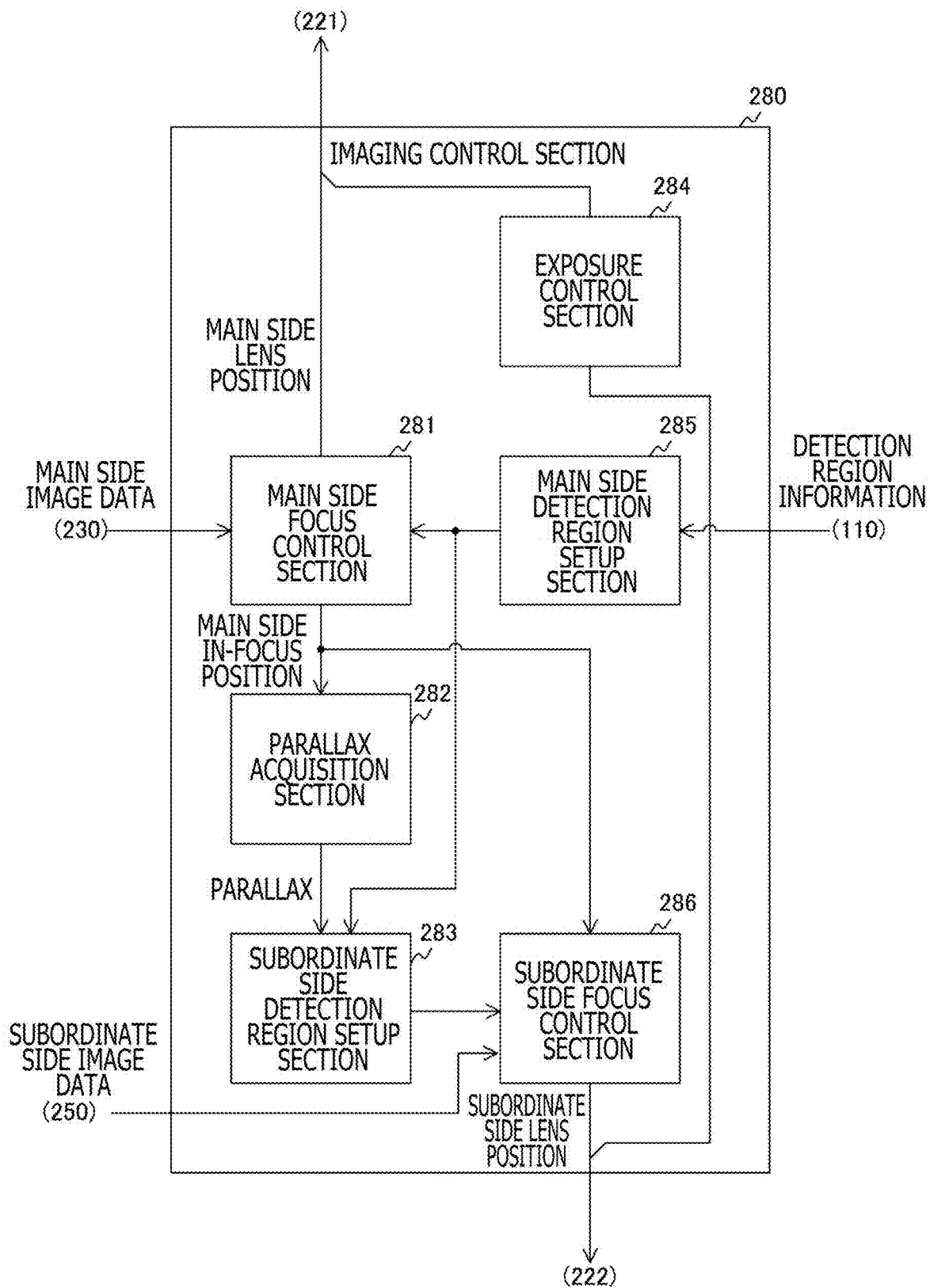
FIG. 8 is a block diagram illustrating a configuration example of an imaging control section in the first embodiment of the present technology.

FIG. 8 is a block diagram illustrating a configuration example of the imaging control section 280 in the first embodiment of the present technology. This imaging control section 280 includes a main side focus control section 281, a parallax acquisition section 282, a subordinate side detection region setup section 283, an exposure control section 284, a main side detection region setup section 285, and a subordinate side focus control section 286.

The main side detection region setup section 285 sets a main side detection region in accordance with an operation signal. For example, a decoder that interprets the operation signal and converts it into position coordinates in an image is used as the main side detection region setup section 285. The main side detection region setup section 285 supplies the set position to the main side focus control section 281 and the subordinate side detection region setup section 283.

The main side focus control section 281 detects the position of the imaging lens 211 where focus is achieved in the main side detection region as a main side in-focus position. This main side focus control section 281 gradually changes the lens position of the imaging lens 211, refers to the contrast of the main side detection region in the main side image data at each change, and searches for the position of the imaging lens 211 where the contrast is the highest. Such a focus control method is commonly referred to as a contrast AF (Auto Focus) method. In the search, the main side focus control section 281 supplies the position of the main side lens to be driven to the main side drive section 221.

Then, the main side focus control section 281 supplies the searched-for position (i.e., main side in-focus position) to the parallax acquisition section 282 and the subordinate side focus control section 286.

The parallax acquisition section 282 finds a distance on the basis of the main side in-focus position and acquires parallax proportional to the distance. The parallax acquisition section 282 supplies the acquired parallax to the subordinate side detection region setup section 283.

The subordinate side detection region setup section 283 sets a subordinate side detection region position in subordinate side image data on the basis of the parallax and the main side detection region position. This subordinate side detection region setup section 283 converts, for example, parallax into a pixel unit value, shifts the position of the main side detection region by that value, and sets the post-shift position as a position of the subordinate side detection region. Then, the subordinate side detection region setup section 283 calculates an outside-boundary region area ratio P by using the following expression:

$$P = A_{out}/A_{sub}$$

In the above expression, $A_{out}$ is, of the subordinate side detection region, the area of the region pushed off the boundary of the subordinate side image data as a result of the shifting. $A_{sub}$ is the area of the subordinate side detection region as a whole, and the same value as the main side detection region is set.

The subordinate side detection region setup section 283 supplies the position of the subordinate side detection region and the outside-boundary region area ratio P to the subordinate side focus control section 286.

The subordinate side focus control section 286 detects the position of the imaging lens 212 where focus is achieved in the subordinate side detection region as a subordinate side in-focus position. The subordinate side focus control section 286 decides whether the outside-boundary region area ratio P is equal to or less than a given value. In the case where the outside-boundary region area ratio P exceeds the given value, that is, in the case where the outside-boundary region area is large, the majority of the subject to be brought into focus is located outside the boundary. This makes focal detection hardly needed. Therefore, in the case where the outside-boundary region area ratio P is equal to or less than the given value, the subordinate side focus control section 286 detects the subordinate side in-focus position using the contrast AF method and drives the imaging lens 212 to that position.

The exposure control section 284 sets exposure parameters such as exposure time and gain. This exposure control section 284 finds brightness of the main side image data and the subordinate side image data, determines the exposure parameters on the basis of the brightness, and supplies the parameters to the main side solid-state imaging element 230 and the subordinate side solid-state imaging element 250.

It should be noted that the imaging control section 280 detects focus through the contrast AF method, the imaging control section 280 may detect focus through a phase difference AF method that finds an in-focus position on the basis of a phase difference between two images resulting from pupil division instead of the contrast AF method. The phase difference AF method may be an image plane phase difference AF method that provides a phase difference pixel on an image plane or a method in which a line sensor is provided outside the solid-state imaging element. With the image plane phase difference AF method, for example, each phase difference pixel is provided for the main side solid-state imaging element 230 and the subordinate side solid-state imaging element 250. Then, the imaging control section 280 detects a phase difference from pixel data of these phase difference pixels, finds the lens position proportional to the phase difference as an in-focus position, and drives the lens to that position.

FIG. 9 depicts graphs illustrating relationships between a main side lens position and a subordinate side lens position and a distance in the first embodiment of the present technology. a in the figure is a graph illustrating an example of a relationship between the main side lens position and the distance. The vertical axis in a of the figure is a digital value indicating the main side lens position where focus is achieved, and the horizontal axis is the distance to the subject in focus. b in the figure is a graph illustrating an example of a relationship between the subordinate side lens position and the distance. The vertical axis in b of the figure is a digital value indicating the subordinate side lens position where focus is achieved, and the horizontal axis is the distance to the subject in focus.

As illustrated in FIG. 9, the curve illustrating the relationship between the main side lens position and the distance is different from the one for the subordinate side due to the difference in optical properties between the main side and the subordinate side and due to product variations. For example, an adjustment value for adjusting the relational expression thereof is retained in a register or other device for each product. The imaging control section 280 adjusts the relational expression using the adjustment value, thereby finding the distance corresponding to the main side in-focus position.

Figure 10:
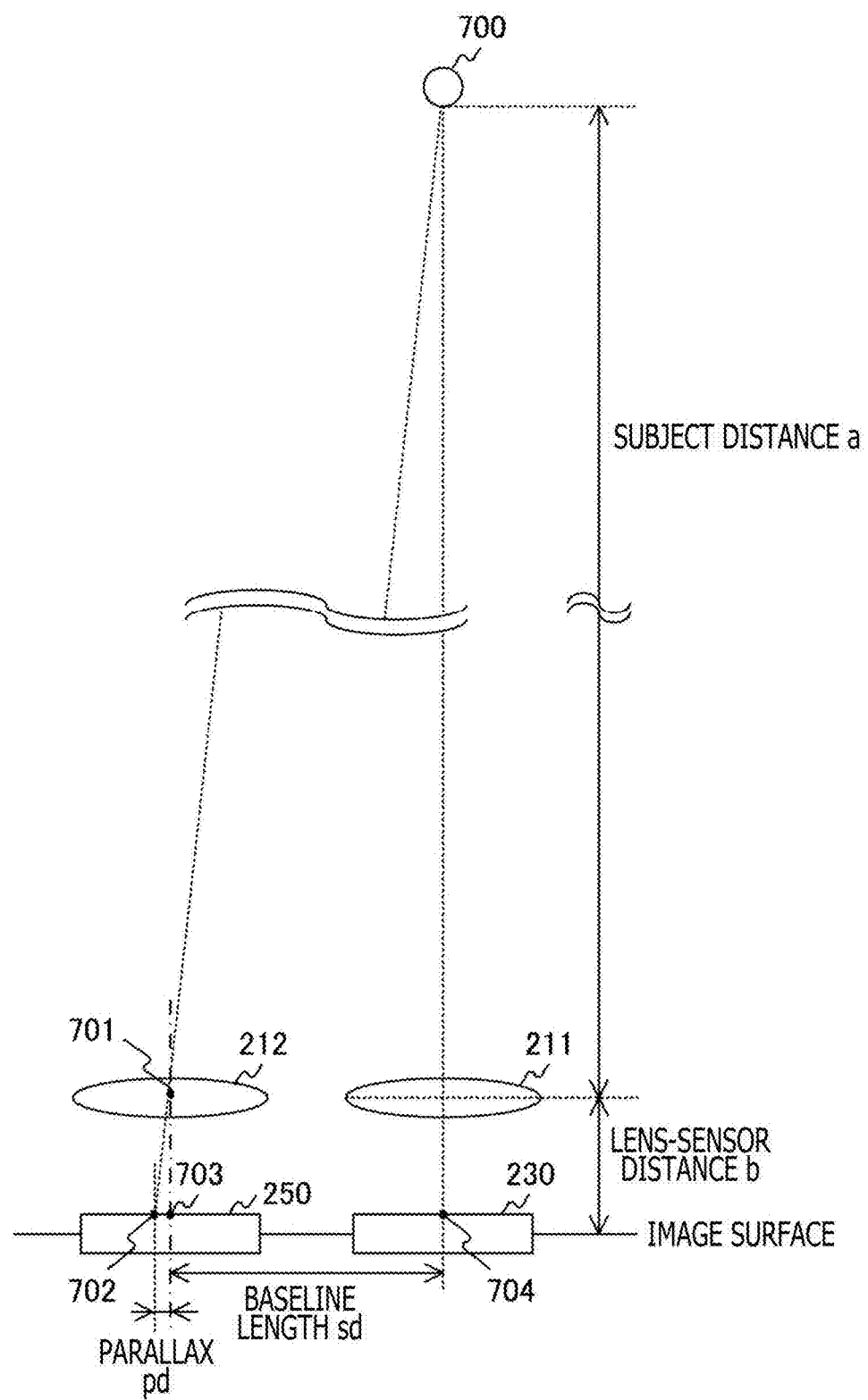
FIG. 10 is a diagram for describing parallax in the case where the distance is far in the first embodiment of the present technology.

FIG. 10 is a diagram for describing parallax in the case where the distance is far in the first embodiment of the present technology. The distance between the imaging lenses 211 and 212 is denoted as a base line length sd, and the distance between the lens (imaging lens 211 or 212) and the solid-state imaging element (main side solid-state imaging element 230 or the subordinate side solid-state imaging element 250) is denoted as a lens-to-sensor distance b. Also, the distance to the subject is denoted as a subject distance a. Here, letting the lens focal distance be denoted as f, the following expression is acquired:

$$1/f = (1/a) + (1/b) \qquad \text{Expression 2}$$

The above expression is commonly referred to as the lens formula.

Deforming Expression 2, the following expression is acquired:

$$a = f^2/(b-f) + f \quad \text{Expression 3}$$

In the above expression, (b−f) corresponds to the lens travel.

The imaging control section 280 substitutes a digital value indicating the main side in-focus position into Expression 1, calculates a main side lens travel, substitutes the travel into (b−f) of Expression 3, and calculates the subject distance a.

Also, a triangle having vertices at a subject 700, an image forming point 704 of the main side solid-state imaging element 230, and an image forming point 702 of the subordinate side solid-state imaging element 250, is similar to a triangle having vertices at a principal point 701 and image formation points 702 and 703 of the imaging lens 212. Here, the point 703 is an intersection point between a perpendicular drawn from the principal point 701 and the image plane. The following expression holds on the basis of the similarity relation:

$$(a+b):(pd+sd) = b:pd \quad \text{Expression 4}$$

Because the base line length sd and the lens-to-sensor distance b are known, the exposure control section 284 can calculate parallax pd from the subject distance a using Expression 4. The curves in FIG. 9 described above are those resulting from the adjustment of the curves acquired from Expressions 1 to 4 by using the adjustment value.

Figure 11:
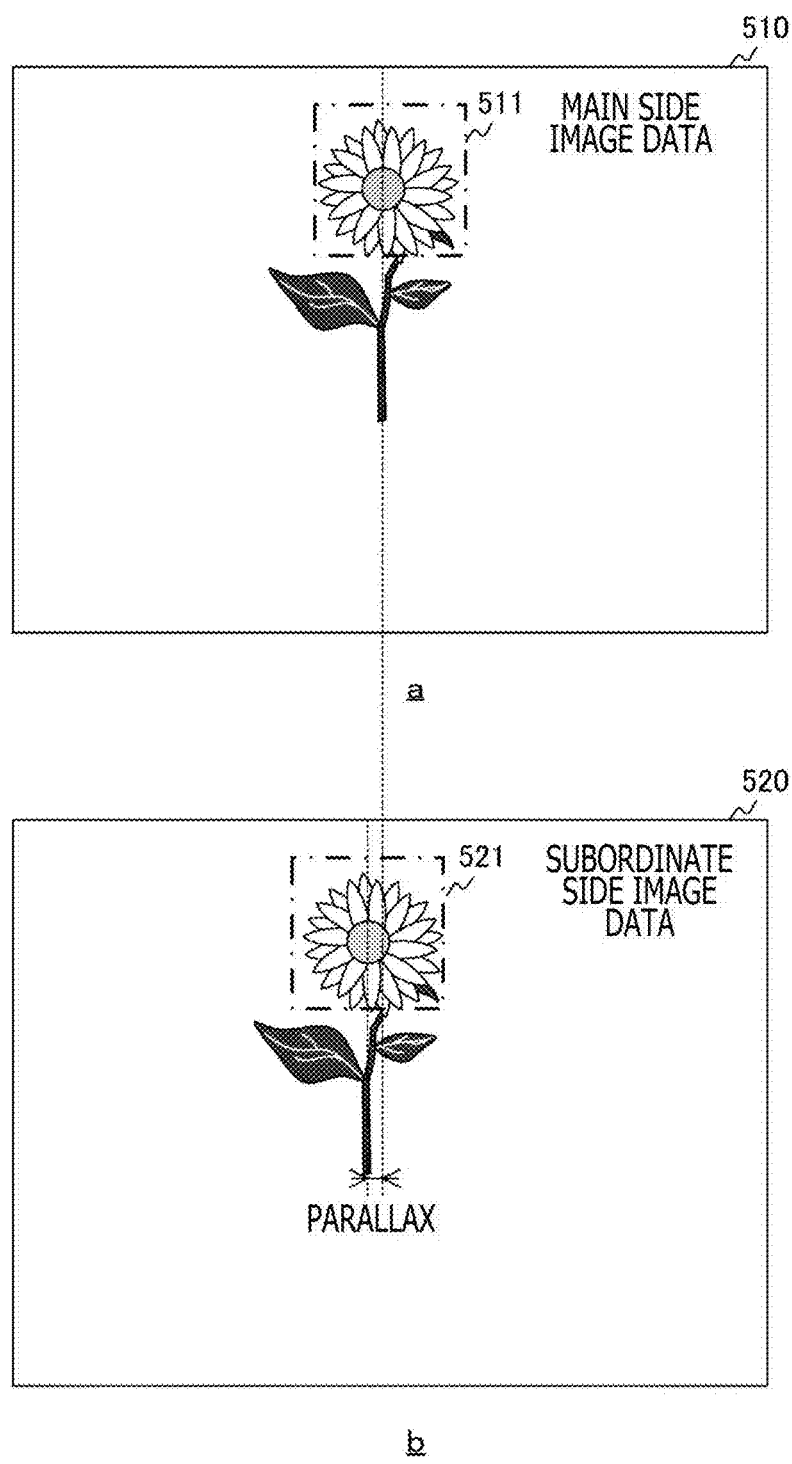
FIG. 11 depicts diagrams illustrating examples of main side image data and subordinate side image data in the case where the distance is far in the first embodiment of the present technology.

FIG. 11 depicts diagrams illustrating examples of main side image data and subordinate side image data in the case where the distance is far in the first embodiment of the present technology. a in the figure is an example of main side image data, and b in the figure is an example of subordinate side image data.

When a certain position in main side image data 510 is specified by a user, the twin-lens camera module 200 sets a rectangular region centered at that position as a main side detection region 511.

Then, the twin-lens camera module 200 detects the main side in-focus position and calculates the distance from the main side in-focus position using Expressions 1 to 4. Next, the twin-lens camera module 200 converts the parallax into an amount of shift in pixel unit and sets, in subordinate side image data 520, a subordinate side detection region 521 centered at the position displaced from the position of the main side detection region 511. As illustrated in FIG. 11, the parallax is relatively small in the case where the distance is far, resulting in a small amount of shift.

FIG. 12 depicts graphs illustrating examples of relationships between contrast and the main side lens position and the subordinate side lens position in the case where the distance is far in the first embodiment of the present technology. a in the figure is a graph illustrating a relationship between the contrast and the main side lens position. The vertical axis in a of the figure is the contrast, and the horizontal axis is the main side lens position. b in the figure is a graph illustrating a relationship between the contrast and the subordinate side lens position. The vertical axis in b of the figure is the contrast, and the horizontal axis is the subordinate side lens position.

The twin-lens camera module 200 detects the main side lens position where the contrast is the highest as a main in-focus position Pm and detects the subordinate side lens position where the contrast is the highest as a main in-focus position Ps.

Figure 13:
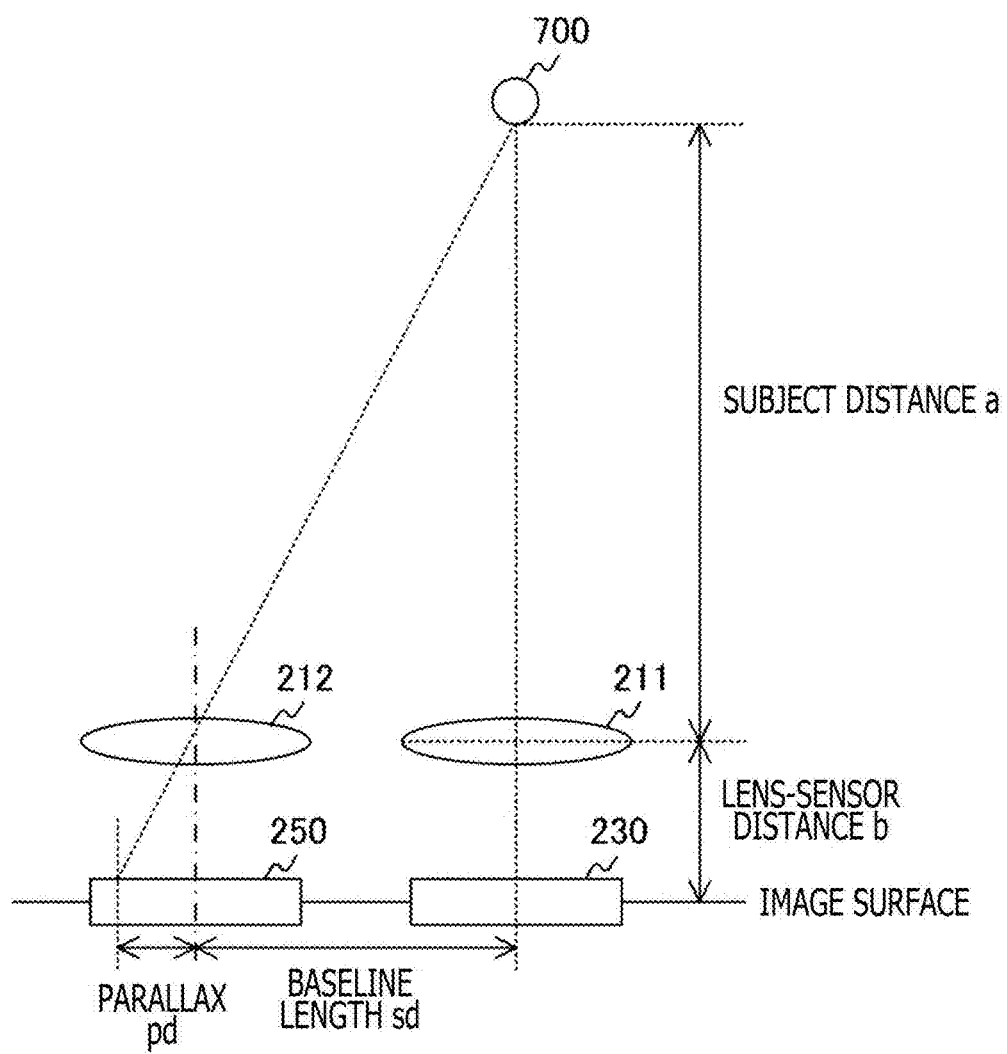
FIG. 13 is a diagram for describing parallax in the case where the distance is close in the first embodiment of the present technology.

FIG. 13 is a diagram for describing parallax in the case where the distance is close in the first embodiment of the present technology. As illustrated in the figure, in the case where the distance is close, the parallax pd is relatively large.

Figure 14:
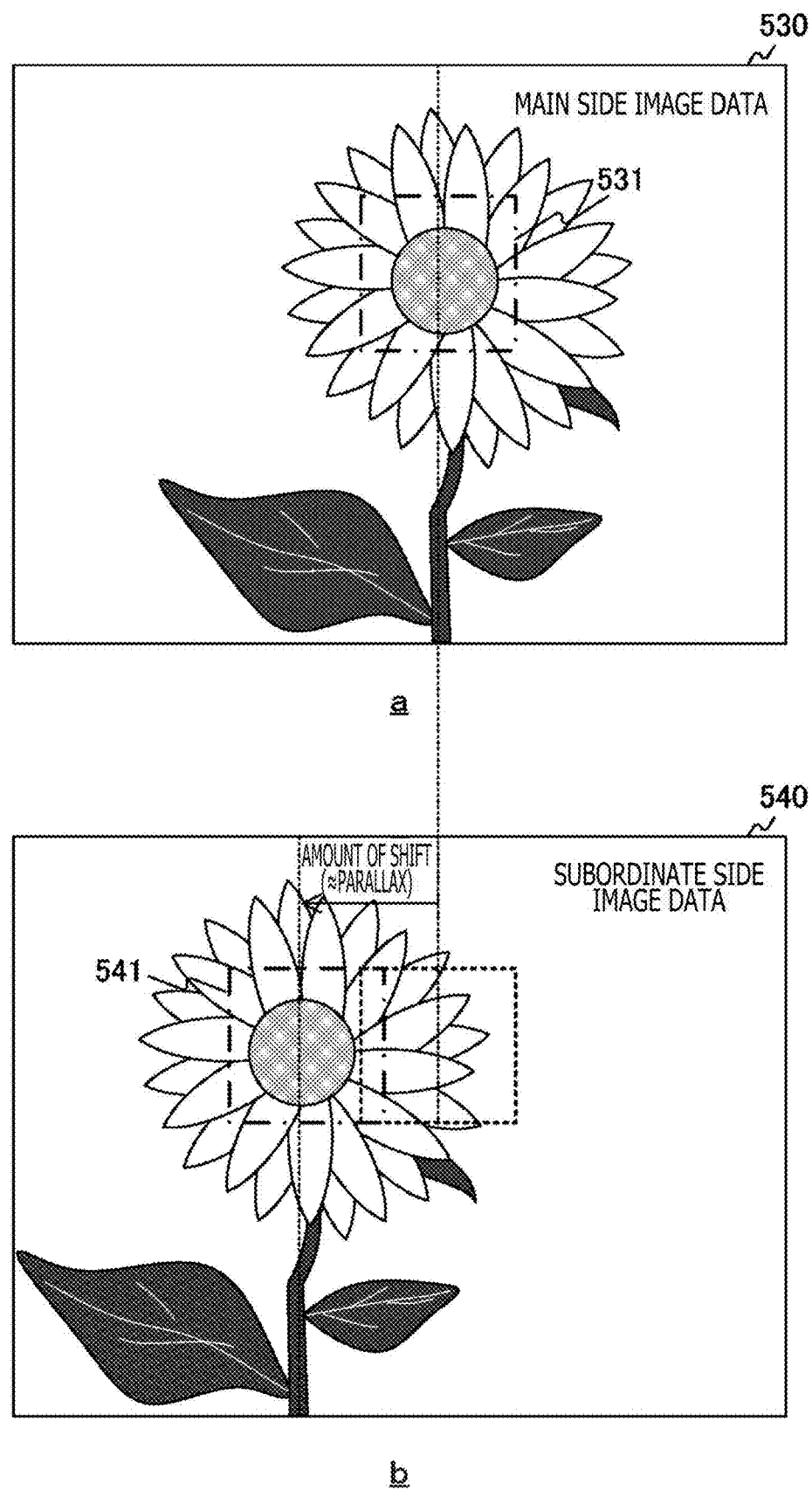
FIG. 14 depicts diagrams illustrating examples of main side image data and subordinate side image data in the case where the distance is close in the first embodiment of the present technology.

FIG. 14 depicts diagrams illustrating examples of main side image data and subordinate side image data in the case where the distance is close in the first embodiment of the present technology. a in the figure is an example of main side image data, and b in the figure is an example of subordinate side image data.

When a certain position in main side image data 530 is specified by a user, the twin-lens camera module 200 sets a rectangular region centered at that position as a main side detection region 531.

Then, the twin-lens camera module 200 calculates the amount of shift proportional to the parallax and sets, in subordinate side image data 540, a subordinate side detection region 541 at the position displaced from the position of the main side detection region 531. As illustrated in FIG. 14, the parallax is relatively large in the case where the distance is close, resulting in a large amount of shift.

It should be noted that although the twin-lens camera module 200 calculates the parallax from the main side in-focus position, it is technically possible to calculate the parallax by means of image processing using two pieces of image data illustrated in FIG. 14. It should be noted, however, that this method involves an extremely large number of calculations. For example, a method is known that extracts feature points for each of the two pieces of image data, associates these features points with each other, and finds the difference between the corresponding points as parallax. However, this method requires that entire image data be processed. For this reason, the higher the image data resolution, the larger the number of calculations. In contrast, the twin-lens camera module 200 that calculates the parallax from the main side in-focus position calculates the parallax from simple expressions such as Expressions 1 to 4, thus contributing to reduced number of calculations.

FIG. 15 depicts graphs illustrating examples of relationships between contrast and the main side lens position and the subordinate side lens position before shifting in the case where the distance is close in the first embodiment of the present technology. a in the figure is a graph illustrating a relationship between the contrast and the main side lens position. The vertical axis in a of the figure is the contrast, and the horizontal axis is the main side lens position. b in the figure is a graph illustrating a relationship between the contrast and the subordinate side lens position in a comparative example in which the subordinate side is not shifted relative to the main side. The vertical axis in b of the figure is the contrast, and the horizontal axis is the subordinate side lens position.

If a subordinate side detection region is set without shifting the subordinate side relative to the main side in the case where the parallax is large, a subject that was brought into focus on the main side may not fit into the subordinate side detection region. As a result, as illustrated in FIG. 15, the relationship between the contrast and the lens position on the subordinate side is significantly different from that on the main side. Therefore, a subject that was brought into focus by the twin-lens camera module 200 on the main side cannot be brought into focus on the subordinate side.

Figure 16:
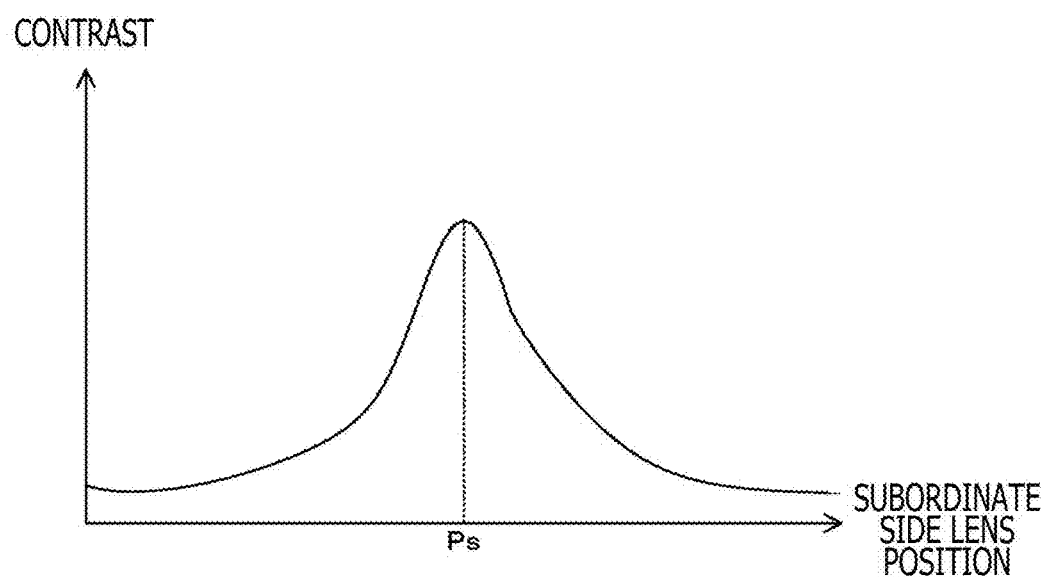
FIG. 16 is a graph illustrating an example of a relationship between contrast and the subordinate side lens position after shifting in the case where shifting takes place in the first embodiment of the present technology.

FIG. 16 is a graph illustrating an example of a relationship between the contrast and the subordinate side lens position after shifting in the case where shifting takes place in the first embodiment of the present technology. Because shifting takes place in proportion to the parallax, a subject that was brought into focus on the main side fits into the subordinate side detection region, rendering the relationship between the contrast and the lens position on the subordinate side close to the one on the main side. This allows the twin-lens camera module 200 to bring a subject that was brought into focus on the main side into focus on the subordinate side, as well.

Figure 17:
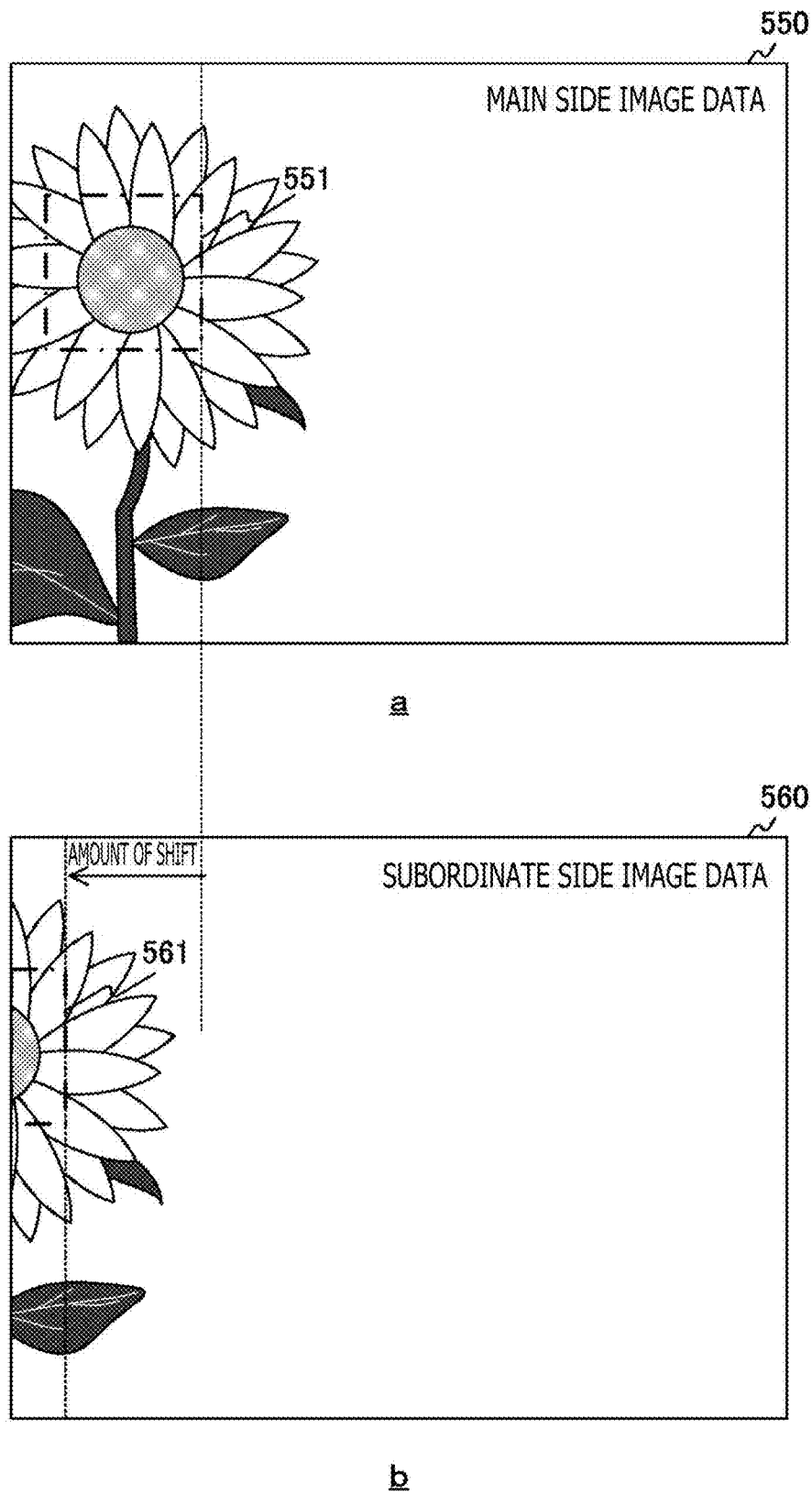
FIG. 17 depicts diagrams illustrating examples of main side image data and subordinate side image data in the case where part of a subordinate side detection region is pushed off the image data in the first embodiment of the present technology.

FIG. 17 depicts diagrams illustrating examples of main side image data and subordinate side image data in the case where part of a subordinate side detection region is pushed off the image data in the first embodiment of the present technology. a in the figure is an example of main side image data, and b in the figure is an example of subordinate side image data.

In main side image data 550, we assume that a main side detection region 551 is set at a position close to the left or right edge. In this case, if a subordinate side detection region 561 is set at a position shifted relative to the main side in subordinate side image data 560, part of the subordinate side detection region 561 may be pushed off the boundary of the subordinate side image data as illustrated in b of FIG. 17. If the region pushed off the boundary is large, the majority of the subject to be brought into focus is pushed off the boundary, making focal detection hardly needed.

For this reason, the twin-lens camera module 200 does not detect a subordinate side in-focus position in the case where the outside-boundary region area ratio P is larger than the given value. In the contrast AF method, it is necessary to search for an in-focus position while at the same time changing the lens position. Therefore, it commonly takes a longer time to find focus than the phase difference AF method. As described above, because the twin-lens camera module 200 does not perform unnecessary focal detection, it is possible to reduce the time it takes before capture of an image to be recorded.

Operation Example of Imaging Apparatus

Figure 18:
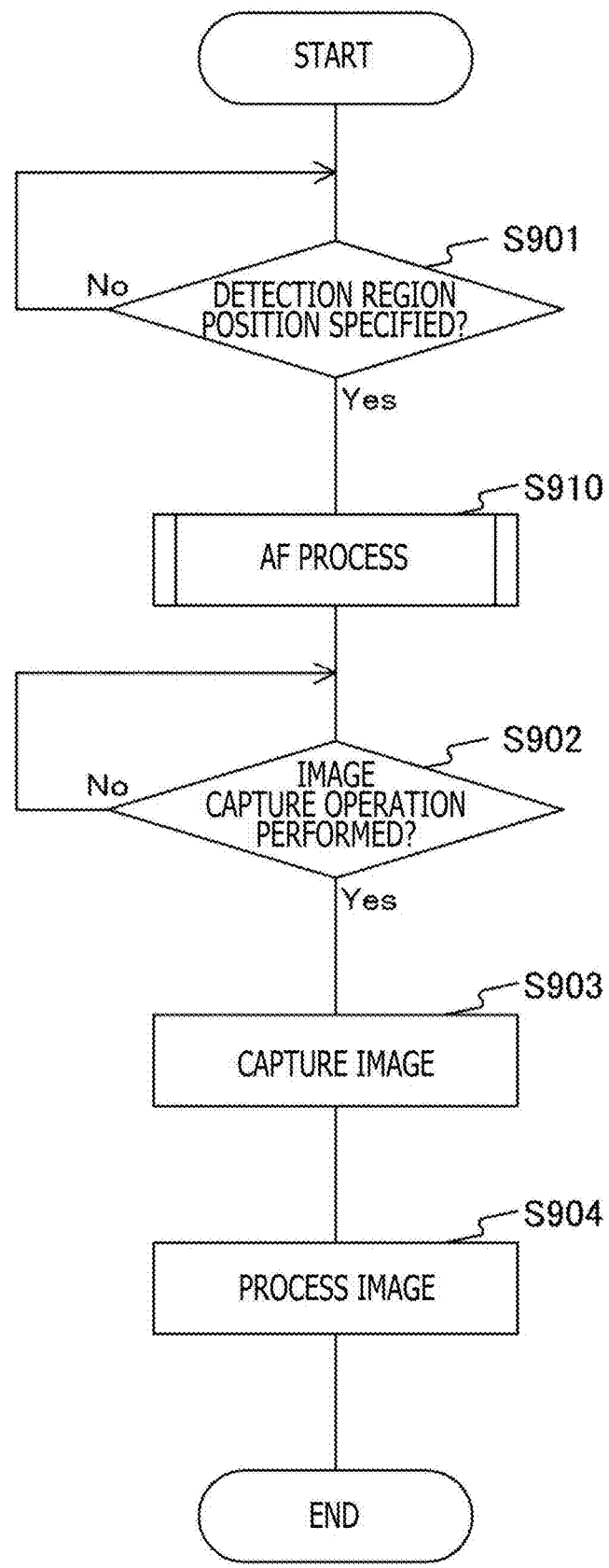
FIG. 18 is a flowchart illustrating an example of operation of the imaging apparatus in the first embodiment of the present technology.

FIG. 18 is a flowchart illustrating an example of operation of the imaging apparatus 100 in the first embodiment of the present technology. This operation is initiated when an application for capturing an image is executed in the imaging apparatus 100. The imaging apparatus 100 decides whether a detection region position has been specified by the user (step S901). In the case where a detection region position has yet to be specified (No in step S901), the imaging apparatus 100 repeats step S901.

On the other hand, in the case where a detection region position has been specified (Yes in step S901), the imaging apparatus 100 performs the AF process for detecting focus (step S910). Then, the imaging apparatus 100 decides whether an imaging operation has been performed by the user to capture an image to be recorded (step S902). In the case where an imaging operation has yet to be performed (No in step S902), the imaging apparatus 100 repeats step S902 and subsequent steps.

On the other hand, in the case where imaging operation has been performed (Yes in step S902), the imaging apparatus 100 captures main image data and subordinate image data (step S903). The imaging apparatus 100 generates an image to be recorded by performing image processing including a process of synthesizing these pieces of image data (step S904). The imaging apparatus 100 terminates the operation for capturing an image after step S904.

It should be noted that although the imaging apparatus 100 captures an image when imaging operation is performed after the AF process (step S910), an image may be captured immediately after the AF process even if no imaging operation is performed.

Figure 19:
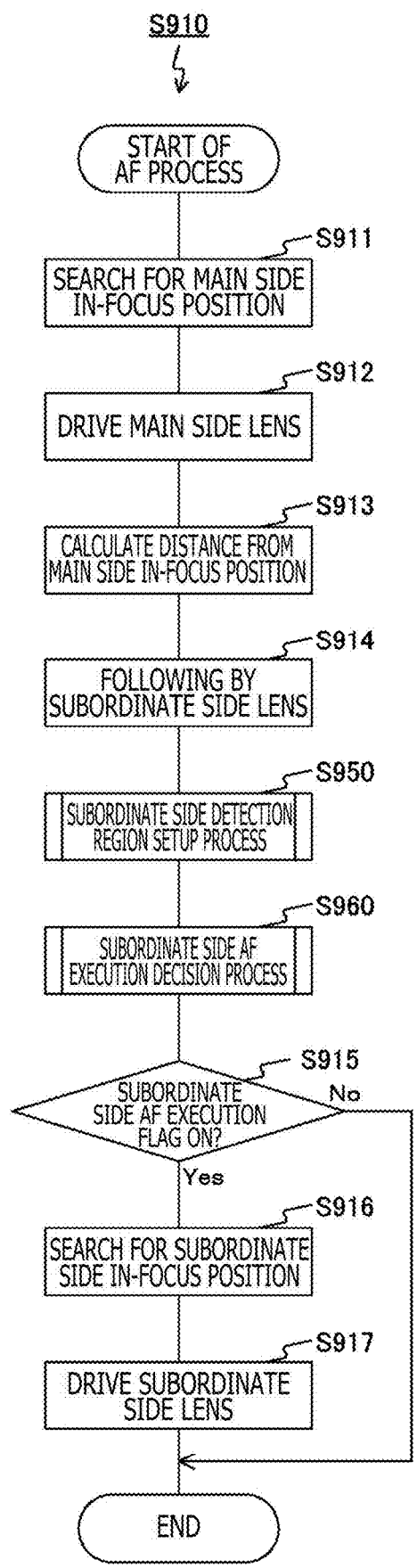
FIG. 19 is a flowchart illustrating an example of an AF process in the first embodiment of the present technology.

FIG. 19 is a flowchart illustrating an example of the AF process in the first embodiment of the present technology. The imaging control section 280 searches for a main side in-focus position through the contrast AF method (step S911).

The imaging control section 280 causes the main side lens to be driven to the main side in-focus position (step S912). The imaging control section 280 calculates the subject distance from the main side in-focus position using Expressions 1 and 3 (step S913). Also, the imaging control section 280 causes the subordinate side imaging lens 212 to be driven to the position corresponding to the subject distance on the basis of the relationship between the subject distance and the subordinate side lens position illustrated in b of FIG. 9. This allows the subordinate side lens to follow the main side (step S914).

Next, the imaging control section 280 performs a subordinate side detection region setup process for setting a subordinate side detection region (step S950) and performs a subordinate side AF execution decision process for deciding whether to perform focal detection on the subordinate side (step S960).

The imaging control section 280 decides whether a subordinate side AF execution flag is ON (step S915). Here, the subordinate side AF execution flag is a flag that indicates a decision result as to whether focal detection is performed on the subordinate side, and ON is set in the case where focal detection is performed, and OFF is set in the case where focal detection is not performed.

In the case where the subordinate side AF execution flag is ON (Yes in step S915), the imaging control section 280 sets a subordinate side search range in a limited manner and searches for a subordinate side in-focus position through the contrast AF method (step S916). Then, the imaging control section 280 causes the subordinate side lens to be driven to that position (step S917).

On the other hand, in the case where the subordinate side AF execution flag is OFF (No in step S915), or after step S917, the imaging control section 280 terminates the AF process.

Figure 20:
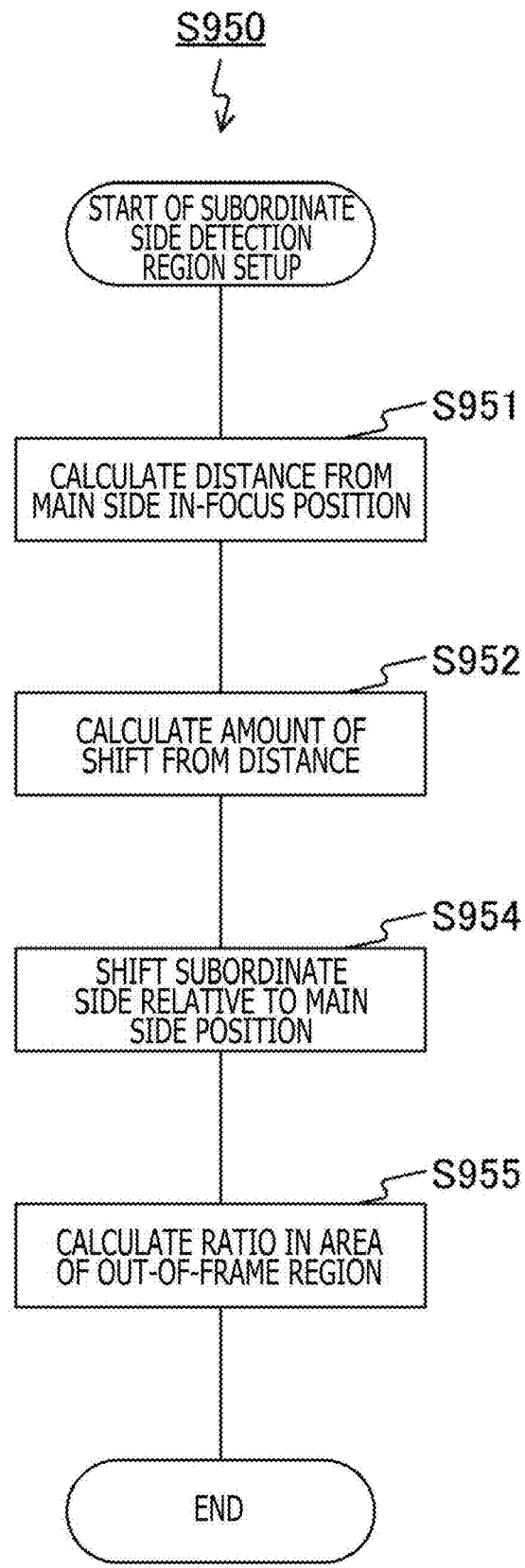
FIG. 20 is a flowchart illustrating an example of a subordinate side detection region setup process in the first embodiment of the present technology.

FIG. 20 is a flowchart illustrating an example of a subordinate side detection region setup process in the first embodiment of the present technology. The imaging control section 280 calculates the distance from the main side in-focus position using Expressions 1 and 3 (step S951). Then, the imaging control section 280 calculates the parallax from the distance using Expression 4 and converts it into an amount of shift (step S952). Next, the imaging control section 280 sets a subordinate side detection region by shifting the subordinate side by the amount of shift relative to the main side position (step S954). Also, the imaging control section 280 calculates the outside-boundary region area ratio (step S955) and terminates the subordinate side detection region setup process.

Figure 21:
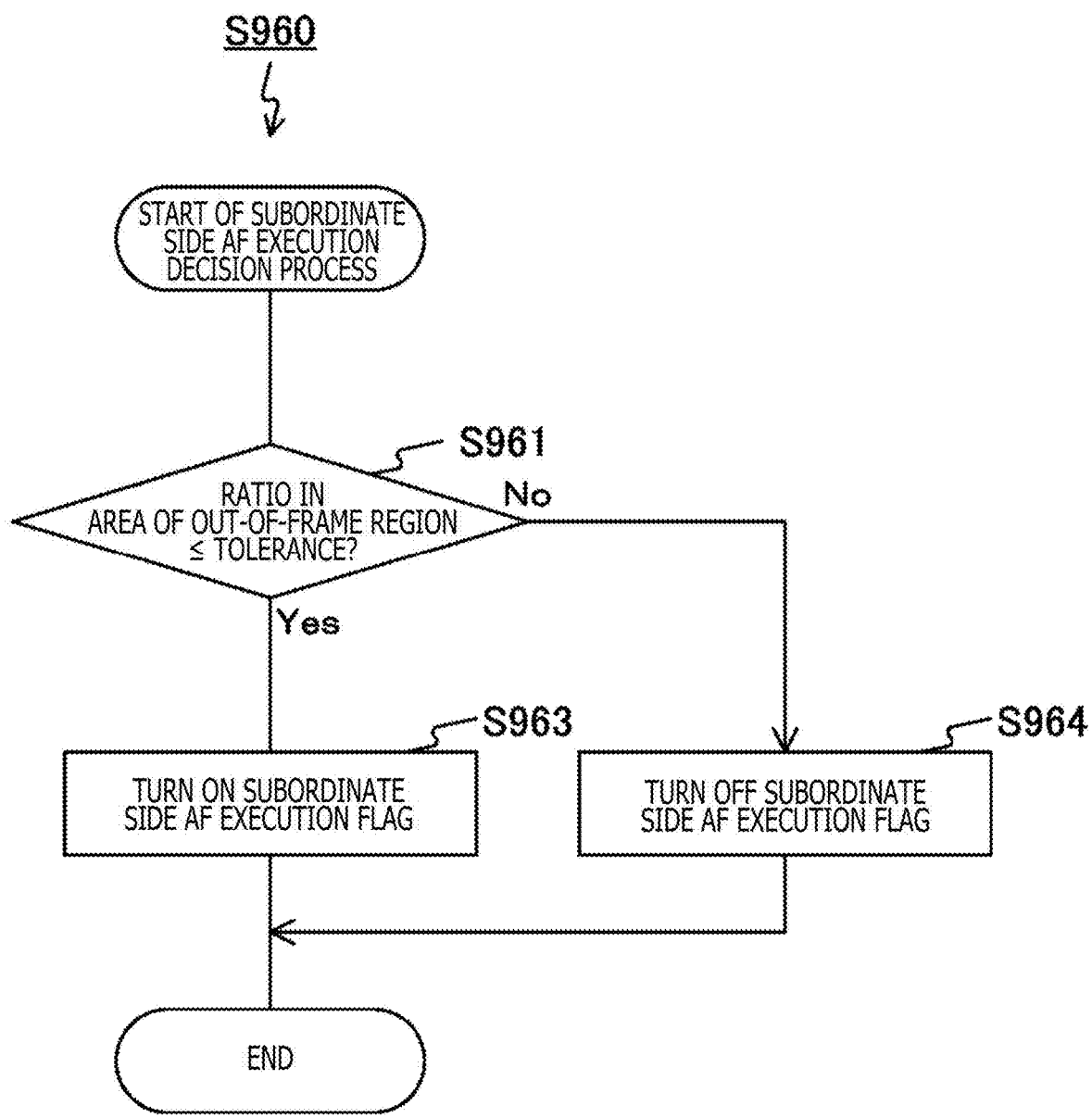
FIG. 21 is a flowchart illustrating an example of a subordinate side AF execution decision process in the first embodiment of the present technology.

FIG. 21 is a flowchart illustrating an example of a subordinate side AF execution decision process in the first embodiment of the present technology. The imaging control section 280 decides whether the outside-boundary region area ratio is equal to or less than a given tolerance (step S961). In the case where the outside-boundary region area ratio is equal to or less than the given tolerance (Yes in step S961), the imaging control section 280 turns ON the subordinate side AF execution flag (step S963).

On the other hand, in the case where the outside-boundary region area ratio exceeds the given tolerance (No in step S961), the imaging control section 280 turns OFF the subordinate side AF execution flag (step S964). After step S963 or S964, the imaging control section 280 terminates the subordinate side AF execution decision process.

Thus, the first embodiment of the present technology sets a subordinate side detection region at a position where the main side position has been shifted using parallax found from the main side in-focus position, making it possible to bring a subject, that has been brought into focus on the main side, into focus on the subordinate side, as well.

Second Embodiment

In the first embodiment, two pieces of image data having the same zoom magnification were captured by using the imaging lenses 211 and 212 having the same view angle. As a result, it is difficult to change the zoom magnification without reducing the image quality. Although the zoom magnification can be optically changed by adding a zoom lens, this leads to a larger size of the twin-lens camera module 200, making it likely that the twin-lens camera module 200 may not fit into a compact piece of equipment such as smartphone. Also, although electronic zoom can be used as an alternative method, this leads to degraded image quality. For this reason, in a second embodiment, two imaging lenses having different view angles are provided, and these lenses are switched from one to the other, thereby changing the zoom magnification while at the same time maintaining the image quality. The twin-lens camera module 200 in this second embodiment differs from the first embodiment in that two imaging lenses having different view angles are provided.

Figure 22:
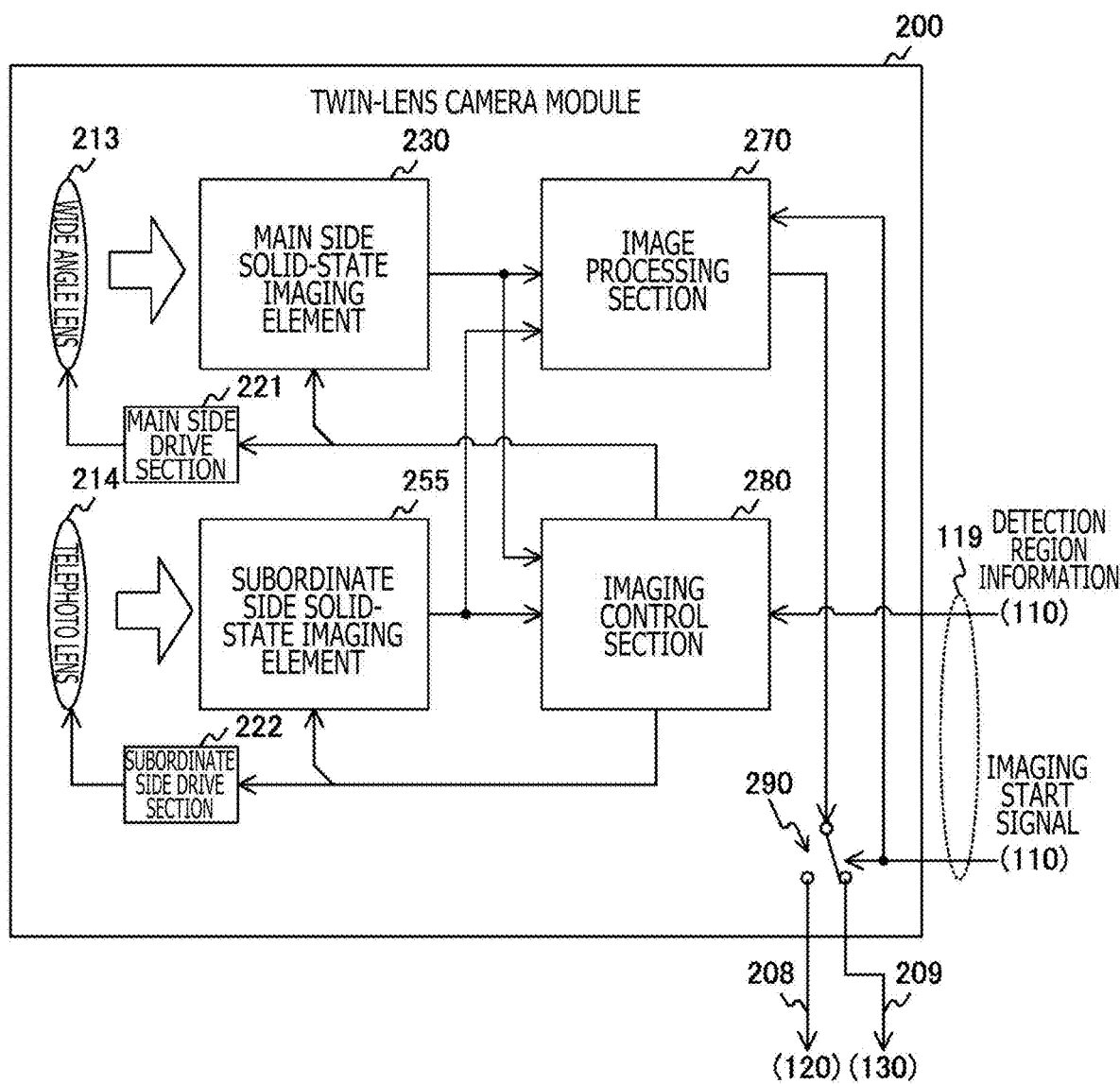
FIG. 22 is a block diagram illustrating a configuration example of the twin-lens camera module in a second embodiment of the present technology.

FIG. 22 is a block diagram illustrating a configuration example of the twin-lens camera module 200 in the second embodiment of the present technology. This twin-lens camera module 200 in the second embodiment differs from the first embodiment in that it includes a wide angle lens 213 and a telephoto lens 214 in place of the imaging lenses 211 and 212. Also, the twin-lens camera module 200 differs from the first embodiment in that it includes a subordinate side solid-state imaging element 255 in place of the subordinate side solid-state imaging element 250.

The wide angle lens 213 is a single focus lens having a wider view angle than the telephoto lens 214. This wide angle lens 213 condenses light and guides it to the main side solid-state imaging element 230. It should be noted that the wide angle lens 213 is an example of a main side lens described in the scope of claims.

The telephoto lens 214 is a single focus lens having a narrower view angle than the wide angle lens 213. This telephoto lens 214 condenses light and guides it to the subordinate side solid-state imaging element 250. It should be noted that the telephoto lens 214 is an example of a subordinate side lens described in the scope of claims.

Also, the subordinate side solid-state imaging element 255 in the second embodiment has a color filter as does the main side.

When the user performs an operation to increase the zoom magnification to a given value Th1 or more, the image processing section 270 according to the second embodiment selects and outputs the subordinate side image data on the telephoto side without synthesizing it. Also, when the user performs an operation to reduce the zoom magnification to a given value Th2 or less, the image processing section 270 selects and outputs the main side image data on the wide angle side. When the user performs an operation such that the zoom magnification falls between the given value Th1 and the given value Th2, the image processing section 270 synthesizes the main side image data on the wide angle side and the subordinate side image data on the telephoto side, thereby generating an image proportional to the zoom magnification.

Figure 23:
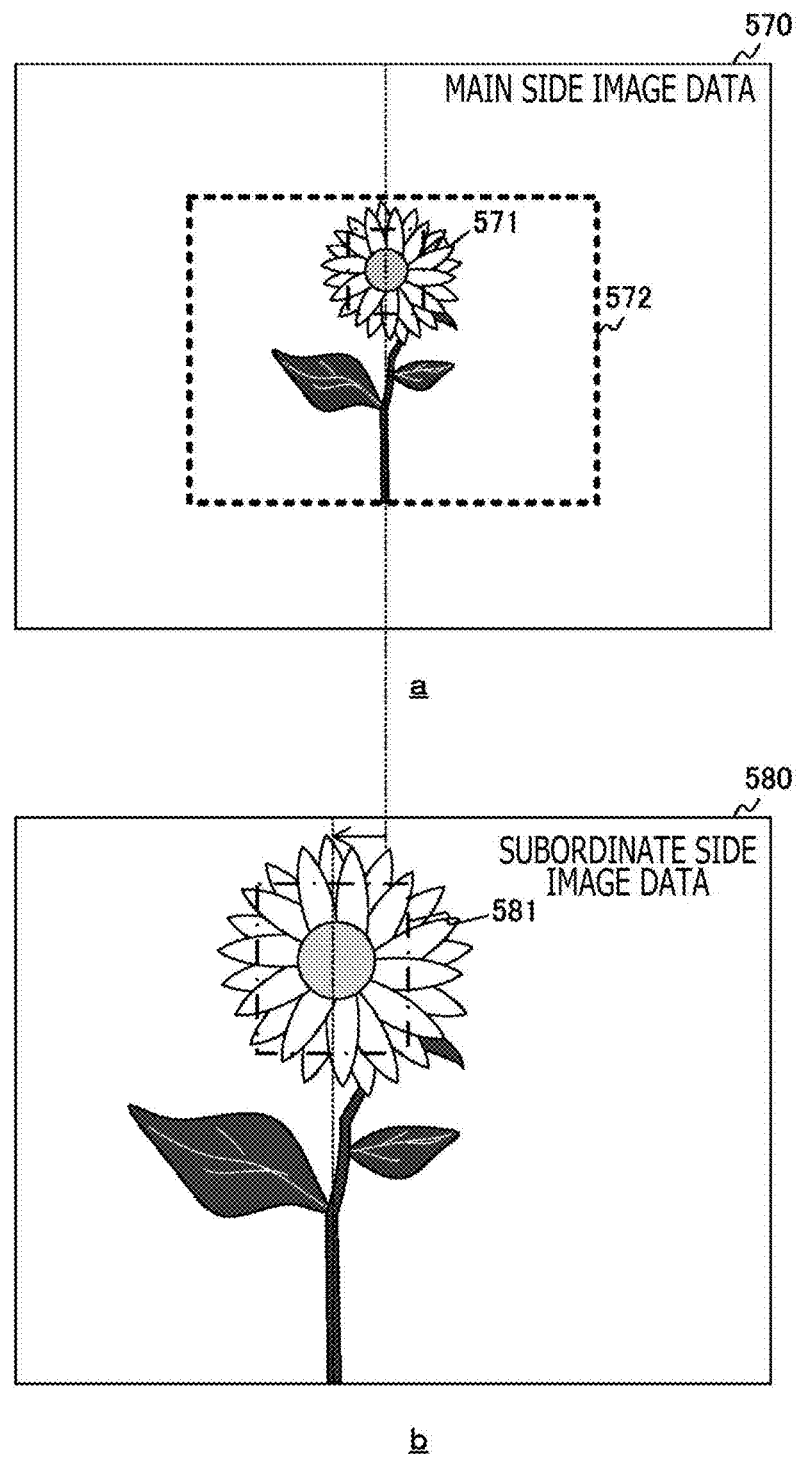
FIG. 23 depicts diagrams illustrating examples of main side image data and subordinate side image data in the case where the subordinate side detection region remains within the image data in the second embodiment of the present technology.

FIG. 23 depicts diagrams illustrating examples of main side image data and subordinate side image data in the case where the subordinate side detection region remains within the image data in the second embodiment of the present technology. a in the figure is an example of the main side image data, and b in the figure is an example of the subordinate side image data.

When the user specifies a position within a region 572 enclosed by a dotted line in main side image data 570, the twin-lens camera module 200 sets a main side detection region 571 at that position. This region 572 is a region corresponding to the view angle of the subordinate side image data.

Then, the twin-lens camera module 200 sets, in subordinate side image data 580, a subordinate side detection region 581 at a position where the main side detection region 571 has been shifted by the amount of shift.

Here, the subordinate side view angle is different from that of the main side. Therefore, the size and amount of shift of the subordinate side detection region 581 are set on the basis of each the main side and subordinate side view angles. As described earlier, the subordinate side has a narrower view angle than the main side. Therefore, the subject is magnified on the subordinate side, and the magnification thereof is determined by the main side view angle and the subordinate side view angle. Letting the magnification of the subordinate side image data relative to the main side image data be denoted as m (where m is a real number), the size of the subordinate side detection region is set m times the size of the main side detection region. Also, the amount of shift is set m times the converted value of the parallax pd.

FIG. 24 depicts diagrams illustrating examples of main side image data and subordinate side image data in the case where part of the subordinate side detection region is pushed off the image data in the second embodiment of the present technology. a in the figure is an example of main side image data, and b in the figure is an example of subordinate side image data.

In main side image data 590, we assume that a main side detection region 591 is set at a position close to the edge portion of a region 592 corresponding to the subordinate side image data. In this case, if a subordinate side detection region 601 that is sized m times larger is set at a position where the main side position has been shifted in subordinate side image data 600, part of the subordinate side detection region 601 may be pushed off the boundary of the subordinate side image data as illustrated in b of FIG. 24. If the region pushed off the boundary is larger than a fixed region, it is hardly necessary to perform focal detection. As a result, the twin-lens camera module 200 does not detect the subordinate side in-focus position. This permits omission of the unnecessary focal detection process, contributing to reduced time before recording of an image to be recorded.

FIG. 25 is a diagram illustrating an example of a main side search range and a subordinate side search range in the second embodiment of the present technology. Here, the main side search range is a distance range within which the main side wide angle lens 213 can be driven to achieve focus. Also, the subordinate side search range is a distance range within which the subordinate side wide angle lens 214 can be driven to achieve focus. A main side optics and a subordinate side optics have different optical properties. Therefore, even if the lenses are driven within the same drive range, the search ranges do not necessarily match. For example, the subordinate side search range becomes narrower than the main side search range. Therefore, the distance that corresponds to the main side in-focus position may not fall within the subordinate side search range. Because it seems that the subordinate side in-focus position does not significantly differ from the main side in-focus position, it is likely in this case that focus may not be detected on the subordinate side. For this reason, in the case where the distance corresponding to the main side in-focus position falls outside the subordinate side search range, the imaging control section 280 does not detect the subordinate side in-focus position.

Figure 26:
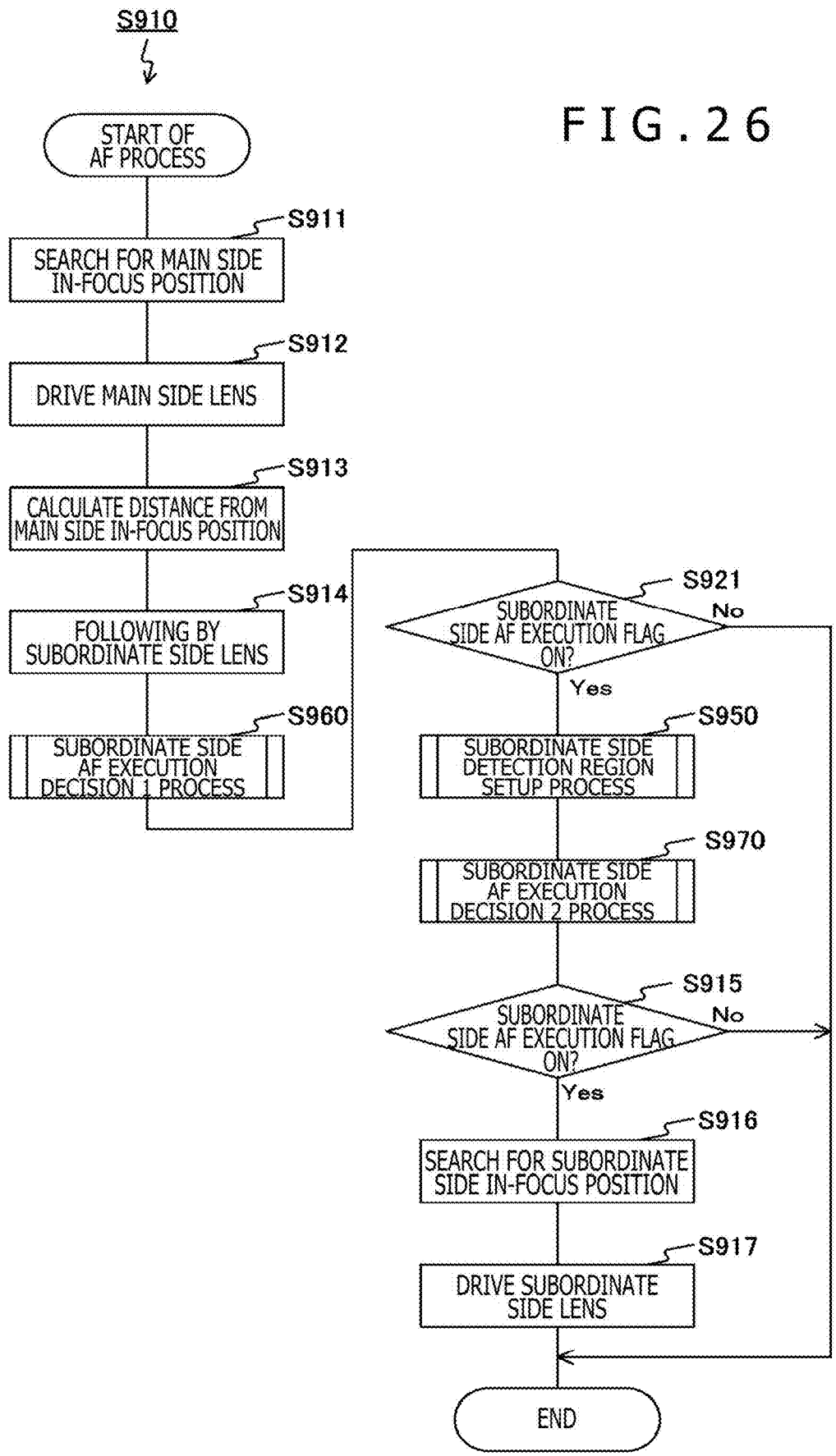
FIG. 26 is a flowchart illustrating an example of an AF process in the second embodiment of the present technology.

FIG. 26 is a flowchart illustrating an example of the AF process in the second embodiment of the present technology. The imaging control section 280 carries out steps from S911 to S914 and performs a subordinate side AF execution decision process 1 (step S960). Then, the imaging control section 280 decides whether the subordinate side AF execution flag is ON (step S921).

In the case where the subordinate side AF execution flag is ON (Yes in step S921), the imaging control section 280 carries out the subordinate side detection region setup process (step S950) and performs a subordinate side execution decision process 2 (step S970). Next, the imaging control section 280 decides whether the subordinate side AF execution flag is ON (step S915).

In the case where the subordinate side AF execution flag is ON (Yes in step S915), the imaging control section 280 performs step S916 and a subsequent step.

In the case where the subordinate side AF execution flag is OFF in step S921 (No in step S921), or in the case where the subordinate side AF execution flag is OFF in step S915 (No in step S915), or after step S917, the imaging control section 280 terminates the AF process.

Figure 27:
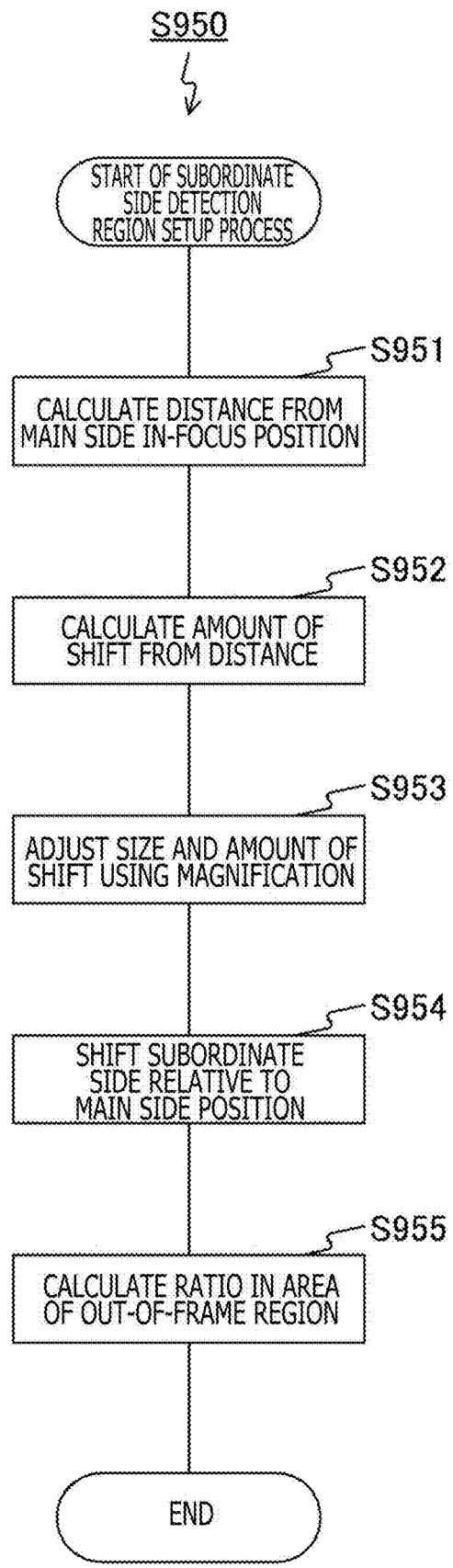
FIG. 27 is a flowchart illustrating an example of a subordinate side detection region setup process in the second embodiment of the present technology.

FIG. 27 is a flowchart illustrating an example of the subordinate side detection region setup process in the second embodiment of the present technology. This subordinate side detection region setup process in the second embodiment differs from the first embodiment in that step S953 is further performed.

After steps S951 and S952, the imaging control section 280 adjusts the size and amount of shift of the subordinate side detection region using the magnification m (step S953). Then, the imaging control section 280 carries out steps S954 and a subsequent step.

Figure 28:
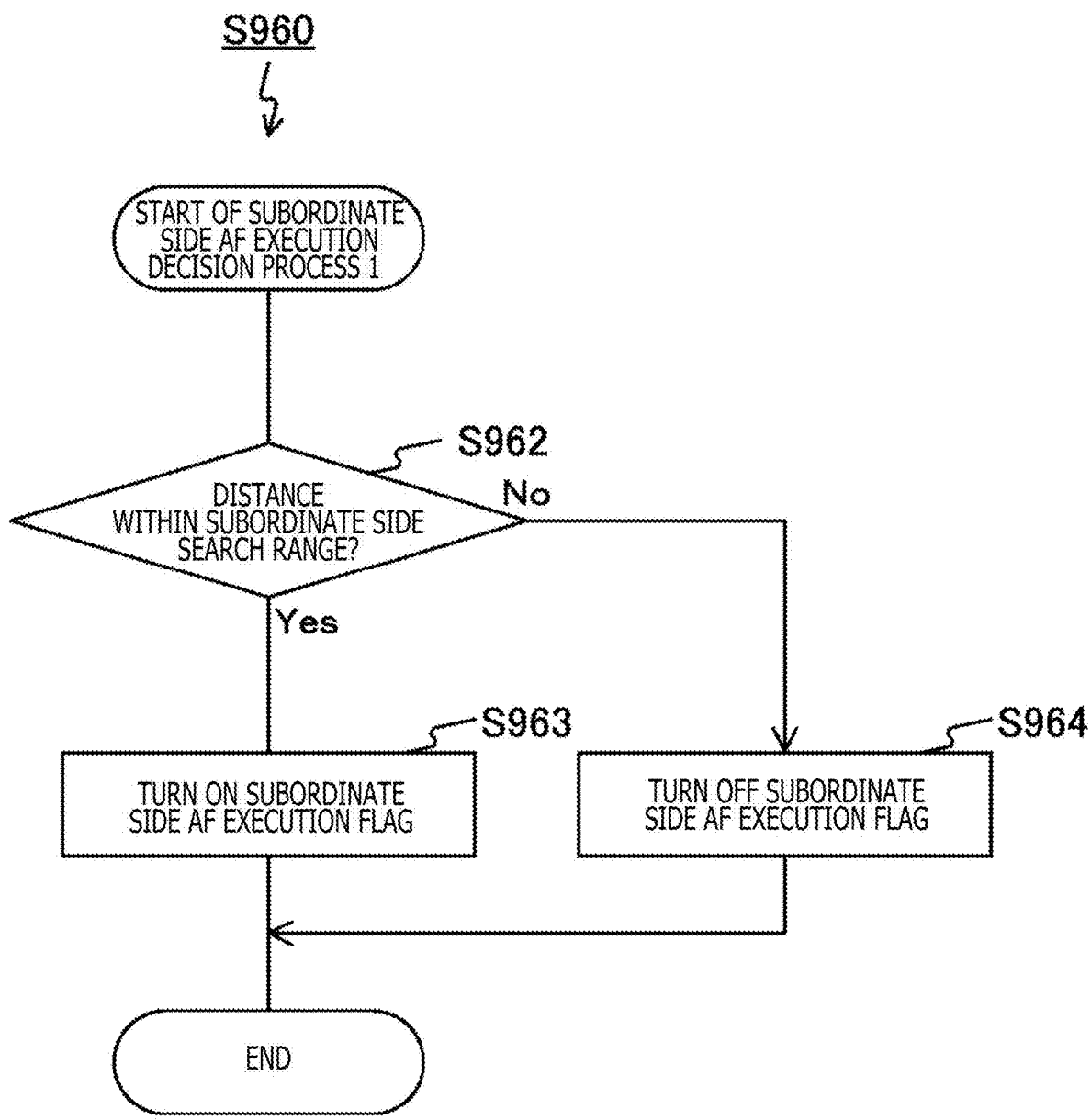
FIG. 28 is a flowchart illustrating an example of a subordinate side AF execution decision process 1 in the second embodiment of the present technology.

FIG. 28 is a flowchart illustrating an example of the subordinate side AF execution decision process 1 in the second embodiment of the present technology. This subordinate side AF execution decision process in the second embodiment differs from the first embodiment in that step S962 is performed in place of step S961.

The imaging control section 280 decides whether the distance corresponding to the main side in-focus position falls within the subordinate side search range (step S962). In the case where the distance corresponding to the main side in-focus position falls within the subordinate side search range (Yes in step S962), the imaging control section 280 turns ON the subordinate side AF execution flag (step S963).

On the other hand, in the case where the corresponding distance falls outside the subordinate side search range (No in step S962), the imaging control section 280 turns OFF the subordinate side AF execution flag (step S964).

Figure 29:
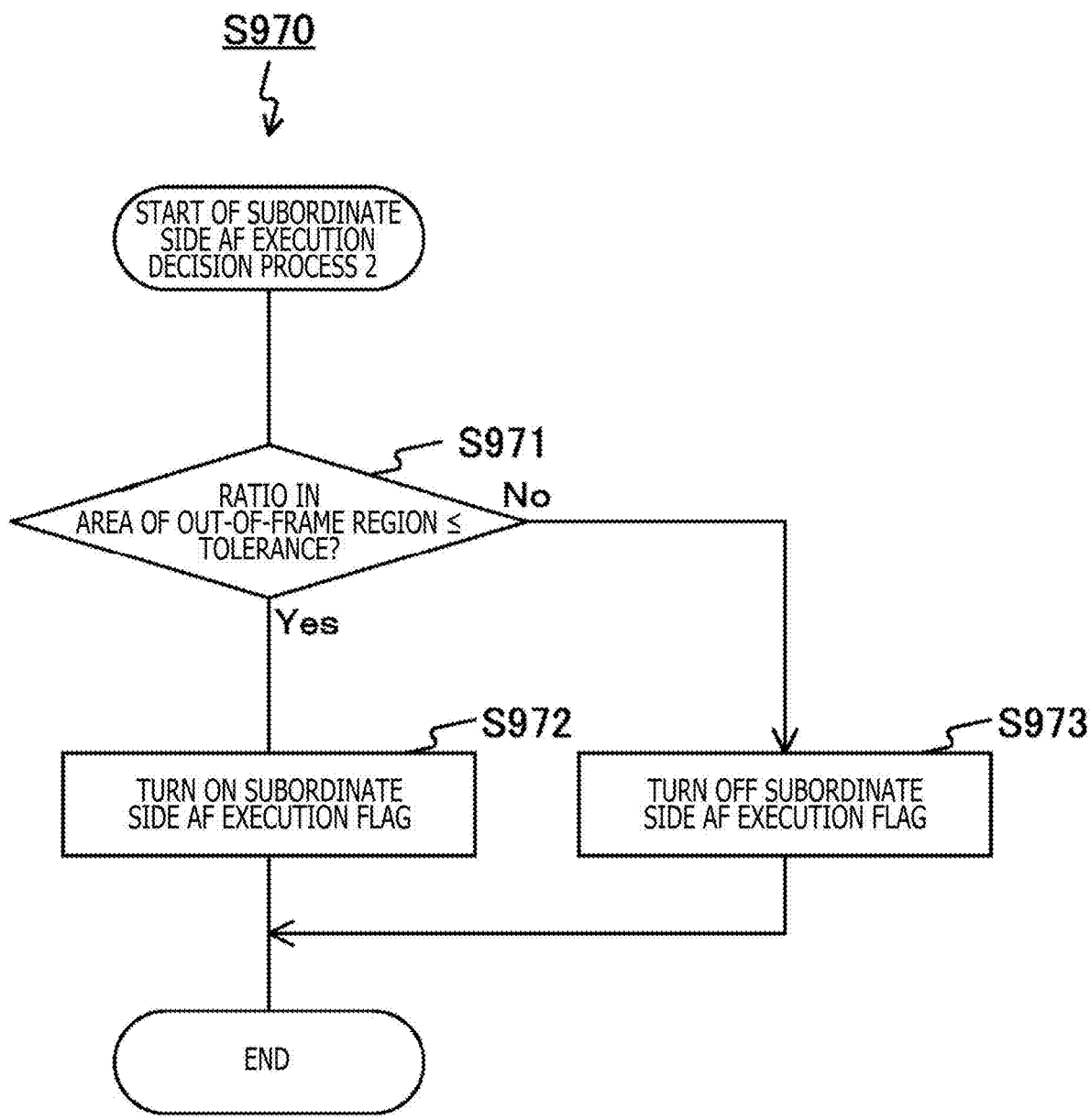
FIG. 29 is a flowchart illustrating an example of a subordinate side AF execution decision process 2 in the second embodiment of the present technology.

FIG. 29 is a flowchart illustrating an example of the subordinate side AF execution decision process 2 in the second embodiment of the present technology. The imaging control section 280 decides whether the outside-boundary region area ratio is equal to or less than a given tolerance (step S971). In the case where the outside-boundary region area ratio is equal to or less than the given tolerance (Yes in step S971), the imaging control section 280 turns ON the subordinate side AF execution flag (step S972).

On the other hand, in the case where the outside-boundary region area ratio exceeds the given tolerance (No in step S971), the imaging control section 280 turns OFF the subordinate side AF execution flag (step S973). After step S972 or S973, the imaging control section 280 terminates the subordinate side AF execution decision process.

Thus, the second embodiment of the present technology captures main side image data and subordinate side image data using the wide angle lens 213 and the telephoto lens 214 and switches therebetween, thereby making it possible to change the zoom magnification while at the same time maintaining the image quality.

3. Application Example to Mobile Body

The technology according to the present disclosure (present technology) can be applied to various products. For example, the technology according to the present disclosure may be implemented as an apparatus incorporated in a mobile body of any type from among an automobile, an electric car, a hybrid electric car, a motorcycle, a bicycle, a personal mobility, an airplane, a drone, a ship, a robot or the like.

Figure 30:
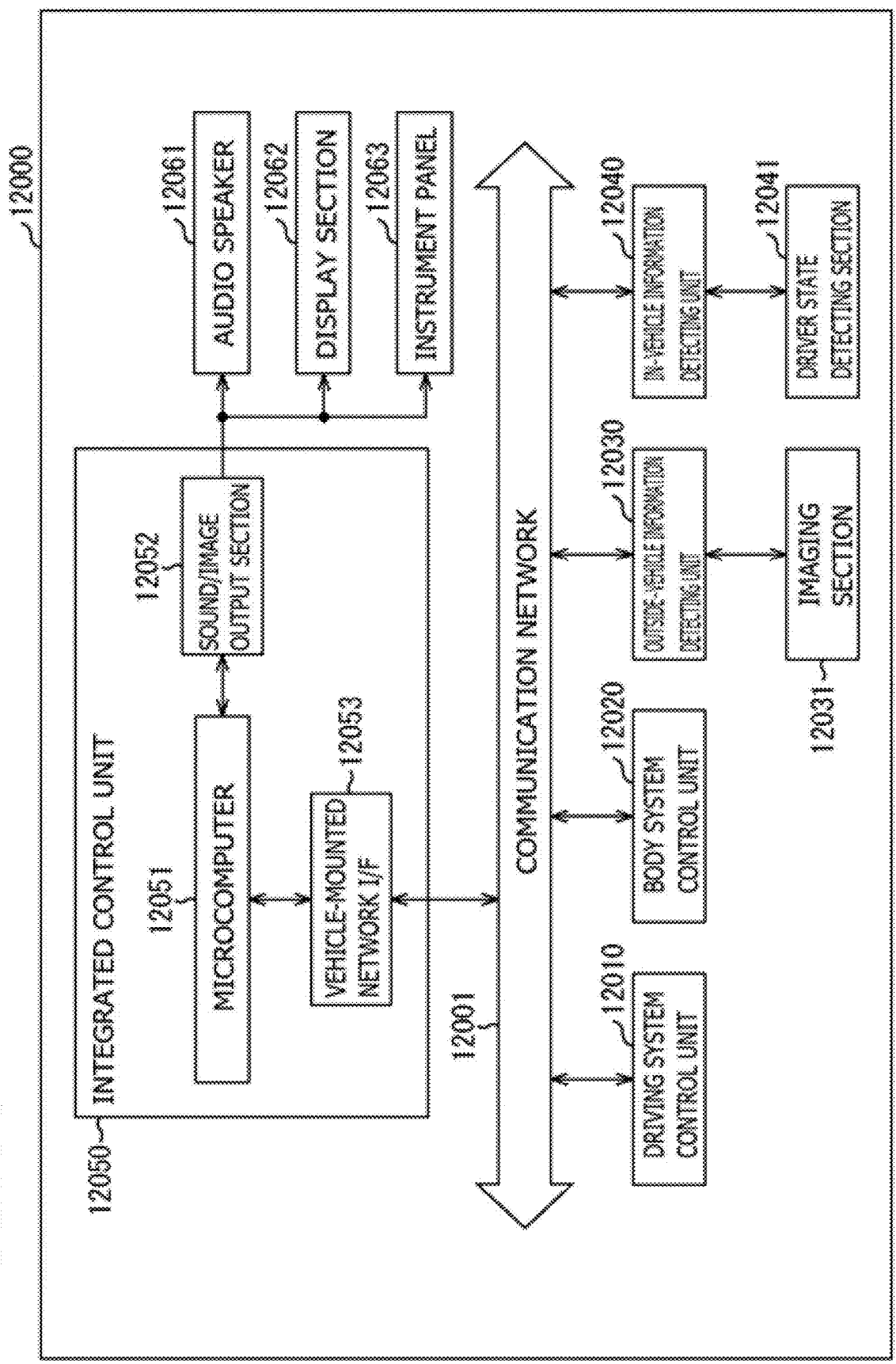
FIG. 30 is a block diagram depicting an example of schematic configuration of a vehicle control system.

FIG. 30 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 30, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are illustrated as the output device. The display section 12062 may, for example, include at least one of an on-board display and a head-up display.

Figure 31:
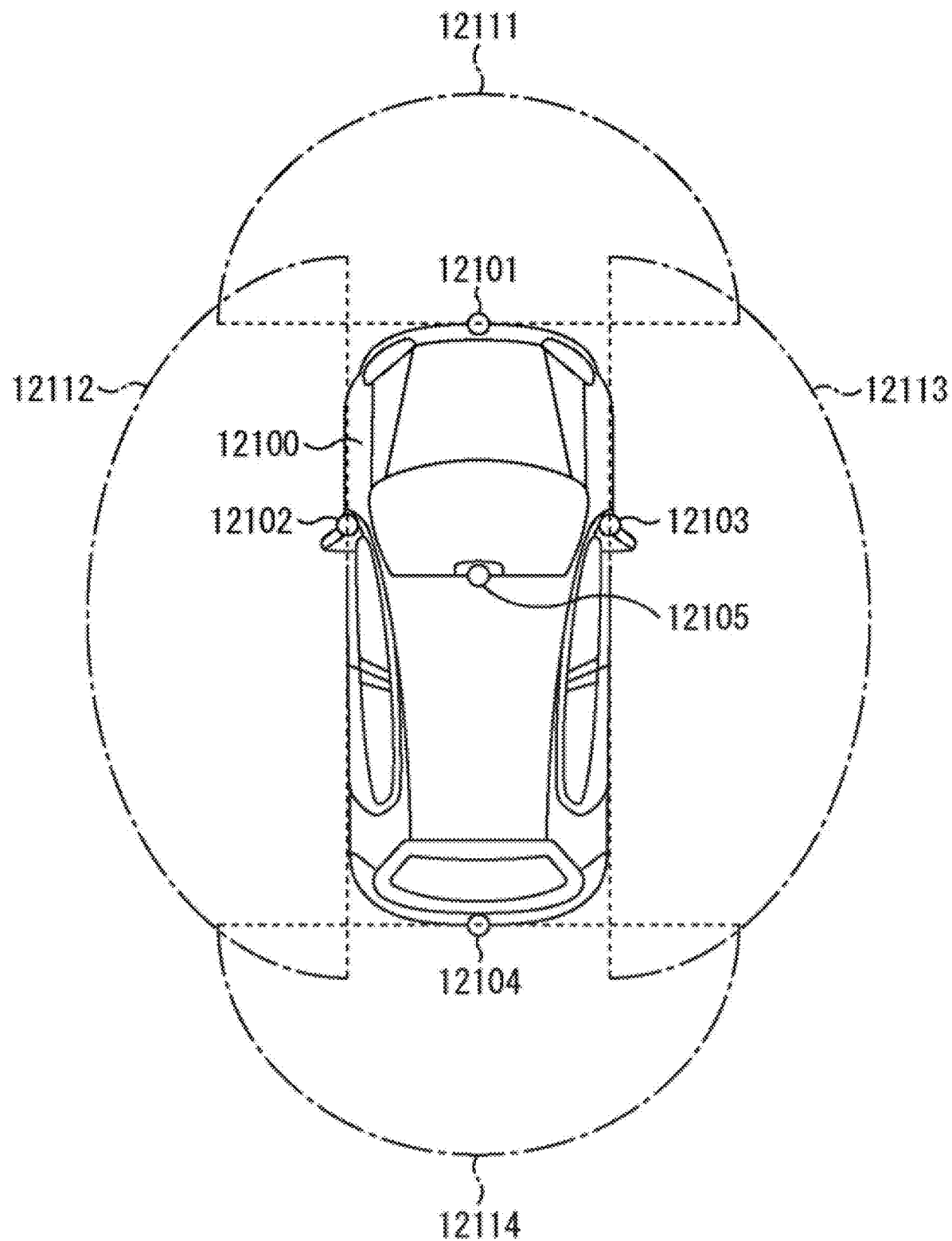
FIG. 31 is a diagram of assistance in explaining an example of installation positions of an outside-vehicle information detecting section and an imaging section.

FIG. 31 is a diagram depicting an example of the installation position of the imaging section 12031.

In FIG. 31, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 31 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Thus, a description has been given of an example of a vehicle control system to which the technology according to the present disclosure is applicable. The technology according to the present disclosure is applicable, of the components described above, to the imaging sections 12101 to 12104. For example, the twin-lens camera module 200 is provided inside each of the imaging sections 12101 to 12104. Image data quality can be improved by applying the present technology to the imaging sections 12101 to 12104, thereby making it possible to reduce drivers' fatigue.

It should be noted that the above embodiments depict an example for realizing the present technology, and the matters in the embodiments and the matters specifying the invention in the scope of claims are respectively in correspondence with each other. Similarly, the matters specifying the invention in the scope of claims and the matters in the embodiments of the present technology denoted by the same names are respectively in correspondence with each other. It should be noted that the present technology is not limited to the embodiments and can be modified in various ways through departing from the gist thereof.

Also, processing procedures described in the above embodiment may be interpreted as a method having a series of these procedures and may also be interpreted as a program for causing a computer to perform the series of procedures or as a recording media that records the program. A CD (Compact Disc), or MD (MiniDisc), a DVD (Digital Versatile Disc), a memory card, a Blu-ray (registered trademark) disc, or the like can be used as this recording media.

It should be noted that the effect described in the present specification is merely illustrative, and there may be other effects.

It should be noted that the present technology can have the following configurations:

(1) An imaging apparatus including:

a main side focus control section adapted to detect, as a main side in-focus position, a main side lens position where focus is achieved in a main side detection region inside a main side image;

a parallax acquisition section adapted to acquire parallax proportional to a distance by finding the distance on the basis of the main side in-focus position;

a subordinate side detection region setup section adapted to set a subordinate side detection region position in a subordinate side image on the basis of the parallax and the main side detection region position; and a subordinate side focus control section adapted to detect, as a subordinate side in-focus position, a subordinate side lens position where focus is achieved in the subordinate side detection region.

(2) The imaging apparatus of feature (1), in which the subordinate side focus control section detects the subordinate side in-focus position in the case where, of the subordinate side detection region, the area of a region outside a boundary of the subordinate side image data does not exceed a given value.

(3) The imaging apparatus of feature (2), in which the main side lens and the subordinate side lens have different view angles, and the subordinate side detection region setup section sets the position and size of the subordinate side detection region on the basis of a magnification of one of the main side image and the subordinate side image relative to the other, the parallax, and the main side detection region position.

(4) The imaging apparatus of feature (3), in which a main side search range, a range of the distance within which focus can be achieved by driving the main side lens, and a subordinate side search range, a range of the distance within which focus can be achieved by driving the subordinate side lens, are different, and the subordinate side focus control section detects the subordinate side in-focus position in the case where the area of the region outside the boundary of the subordinate side image data does not exceed a given value and the distance corresponding to the main side in-focus position falls within the subordinate side search range.

(5) The imaging apparatus of any one of features (1) to (4), further including:

a main side solid-state imaging element adapted to capture the main side image; and a subordinate side solid-state imaging element adapted to capture the subordinate side image, in which the main side solid-state imaging element captures a new main side image when the main side in-focus position is detected, and the subordinate side solid-state imaging element captures a new subordinate side image when the subordinate side in-focus position is detected.

(6) The imaging apparatus of any one of features (1) to (5), in which
the main side focus control section detects the main side lens position where contrast is the highest in the main side detection region as the main side in-focus position, and
the subordinate side focus control section detects the subordinate side lens position where the contrast is the highest in the subordinate side detection region as the subordinate side in-focus position.

(7) The imaging apparatus of any one of features (1) to (5), in which
the main side focus control section detects the main side in-focus position on the basis of a phase difference, and
the subordinate side focus control section detects the subordinate side in-focus position on the basis of a phase difference.

(8) An imaging module including:
a main side focus control section adapted to detect, as a main side in-focus position, a main side lens position where focus is achieved in a main side detection region inside a main side image;
a parallax acquisition section adapted to acquire parallax proportional to a distance by finding the distance on the basis of the main side in-focus position;
a subordinate side detection region setup section adapted to set a subordinate side detection region position in a subordinate side image on the basis of the parallax and the main side detection region position;
a subordinate side focus control section adapted to detect, as a subordinate side in-focus position, a subordinate side lens position where focus is achieved in the subordinate side detection region; and
an image output section adapted to output an image obtained by processing at least either the main side image or the subordinate side image.

(9) A control method of an imaging apparatus, the control method including:
a main side focus control procedure adapted to detect, as a main side in-focus position, a main side lens position where focus is achieved in a main side detection region inside a main side image;
a parallax acquisition procedure adapted to acquire parallax proportional to a distance by finding the distance on the basis of the main side in-focus position;
a subordinate side detection region setup procedure adapted to set a subordinate side detection region position in a subordinate side image on the basis of the parallax and the main side detection region position; and
a subordinate side focus control procedure adapted to detect, as a subordinate side in-focus position, a subordinate side lens position where focus is achieved in the subordinate side detection region.

REFERENCE SIGNS LIST

100 Imaging apparatus
110 Operation section
120 Twin-lens camera module
130 Display section
200 Twin-lens camera module
201, 202 Single lens camera module
203 Connecting member
211, 212 Imaging lens
213 Wide angle lens
214 Telephoto lens
221 Main side drive section
222 Subordinate side drive section
230 Main side solid-state imaging element
231, 251 Driver
232, 252 Analog signal amplifying section
233, 253 AD conversion section
234, 254 Digital signal amplifying section
240 Main side pixel array section
241 R pixel
242 G pixel
243 B pixel
250, 255 Subordinate side solid-state imaging element
260 Subordinate side pixel array section
261 Pixel
270 Image processing section
280 Imaging control section
281 Main side focus control section
282 Parallax acquisition section
283 Subordinate side detection region setup section
284 Exposure control section
285 Main side detection region setup section
286 Subordinate side focus control section
290 Switch
12101, 12102, 12103, 12104, 12105 Imaging section

The invention claimed is:

1. An imaging apparatus comprising:
a main side focus control section adapted to detect, as a main side in-focus position, a main side lens position where focus is achieved in a main side detection region inside a main side image, the main side detection region having a main side detection region position in the main side image;
a parallax acquisition section adapted to acquire parallax proportional to a distance by finding the distance on a basis of the main side in-focus position;
a subordinate side detection region setup section adapted to set a subordinate side detection region position in a subordinate side image on a basis of the parallax and the main side detection region position; and
a subordinate side focus control section adapted to detect, as a subordinate side in-focus position, a subordinate side lens position where focus is achieved in the subordinate side detection region, wherein the subordinate side focus control section detects the subordinate side in-focus position in a case where, of the subordinate side detection region, an area of a region outside a boundary of the subordinate side image data does not exceed a given value.

2. The imaging apparatus of claim 1, wherein
the main side lens and the subordinate side lens have different view angles, and
the subordinate side detection region setup section sets the position and size of the subordinate side detection region on a basis of a magnification of one of the main side image and the subordinate side image relative to another, the parallax, and the main side detection region position.

3. The imaging apparatus of claim 2, wherein
a main side search range, a range of the distance within which focus can be achieved by driving the main side lens, and a subordinate side search range, a range of the distance within which focus can be achieved by driving the subordinate side lens, are different, and
the subordinate side focus control section detects the subordinate side in-focus position in a case where the area of the region outside the boundary of the subordinate side image data does not exceed a given value and the distance corresponding to the main side in-focus position falls within the subordinate side search range.

4. The imaging apparatus of claim 1, further comprising:
a main side solid-state imaging element adapted to capture the main side image; and
a subordinate side solid-state imaging element adapted to capture the subordinate side image, wherein
the main side solid-state imaging element captures a new main side image when the main side in-focus position is detected, and
the subordinate side solid-state imaging element captures a new subordinate side image when the subordinate side in-focus position is detected.

5. The imaging apparatus of claim 1, wherein
the main side focus control section detects the main side lens position where contrast is the highest in the main side detection region as the main side in-focus position, and
the subordinate side focus control section detects the subordinate side lens position where the contrast is the highest in the subordinate side detection region as the subordinate side in-focus position.

6. The imaging apparatus of claim 1, wherein
the main side focus control section detects the main side in-focus position on a basis of a phase difference, and
the subordinate side focus control section detects the subordinate side in-focus position on a basis of a phase difference.

7. An imaging module comprising:
a main side focus control section adapted to detect, as a main side in-focus position, a main side lens position where focus is achieved in a main side detection region inside a main side image, the main side detection region having a main side detection region position in the main side image;
a parallax acquisition section adapted to acquire parallax proportional to a distance by finding the distance on a basis of the main side in-focus position;
a subordinate side detection region setup section adapted to set a subordinate side detection region position in a subordinate side image on a basis of the parallax and the main side detection region position;
a subordinate side focus control section adapted to detect, as a subordinate side in-focus position, a subordinate side lens position where focus is achieved in the subordinate side detection region, wherein the subordinate side focus control section detects the subordinate side in-focus position in a case where, of the subordinate side detection region, an area of a region outside a boundary of the subordinate side image data does not exceed a given value; and
an image output section adapted to output an image obtained by processing at least either the main side image or the subordinate side image.

8. A control method of an imaging apparatus, the control method comprising:
detecting, as a main side in-focus position, a main side lens position where focus is achieved in a main side detection region inside a main side image, the main side detection region having a main side detection region position in the main side image;
acquiring parallax proportional to a distance by finding the distance on a basis of the main side in-focus position;
setting a subordinate side detection region position in a subordinate side image on a basis of the parallax and the main side detection region position; and
detecting, as a subordinate side in-focus position, a subordinate side lens position where focus is achieved in the subordinate side detection region, including detecting the subordinate side in-focus position in a case where, of the subordinate side detection region, an area of a region outside a boundary of the subordinate side image data does not exceed a given value.

* * * * *